(12) United States Patent
Rovers

(10) Patent No.: US 11,741,641 B2
(45) Date of Patent: *Aug. 29, 2023

(54) ASTC INTERPOLATION

(71) Applicant: Imagination Technologies Limited, Kings Langley (GB)

(72) Inventor: Kenneth Rovers, St. Albans (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/685,344

(22) Filed: Mar. 2, 2022

(65) Prior Publication Data

US 2022/0414951 A1 Dec. 29, 2022

Related U.S. Application Data

(63) Continuation of application No. 16/722,584, filed on Dec. 20, 2019, now Pat. No. 11,295,485.

(30) Foreign Application Priority Data

Dec. 20, 2018 (GB) ..................................... 1820836

(51) Int. Cl.
 *G06T 11/00* (2006.01)
 *G06T 9/00* (2006.01)
(52) U.S. Cl.
 CPC .............. *G06T 11/001* (2013.01); *G06T 9/00* (2013.01)
(58) Field of Classification Search
 CPC ....... G06T 11/001; G06T 3/4007; G06T 9/00; G06T 15/04; H04N 19/30; H04N 19/42
 See application file for complete search history.

(56) References Cited

U.S. PATENT DOCUMENTS

| 6,108,007 A | * | 8/2000 | Shochet | .................. G06T 11/40 345/586 |
| 2014/0193081 A1 | * | 7/2014 | Nystad | ...................... G06T 7/40 382/197 |
| 2018/0315218 A1 | | 11/2018 | Rovers et al. | |

FOREIGN PATENT DOCUMENTS

GB 2562041 A1 11/2018

OTHER PUBLICATIONS

ASTC spec, ARM, 2012 (Year: 2012).*

(Continued)

*Primary Examiner* — Jianxun Yang
(74) *Attorney, Agent, or Firm* — Potomac Law Group, PLLC; Vincent M DeLuca

(57) ABSTRACT

A binary logic circuit for performing an interpolation calculation between two endpoint values $E_0$ and $E_1$ using a weighting index i for generating an interpolated result P, the values $E_0$ and $E_1$ being formed from Adaptive Scalable Texture Compression (ASTC) low-dynamic range (LDR) colour endpoint values $C_0$ and $C_1$ respectively, the circuit comprising: an interpolation unit configured to perform an interpolation between the colour endpoint values $C_0$ and $C_1$ using the weighting index i to generate a first intermediate interpolated result $C_2$; and combinational logic circuitry configured to receive the interpolated result $C_2$ and to perform one or more logical processing operations to calculate the interpolated result P according to the equation $P=\lfloor((C_2<<8)+C_2+32)/64\rfloor$ when the interpolated result is not to be compatible with an sRGB colour space, and according to the equation $P=\lfloor((C_2<<8)+128\cdot 64+32)/64\rfloor$ when the interpolated result is to be compatible with an sRGB colour space.

20 Claims, 13 Drawing Sheets

(56) References Cited

OTHER PUBLICATIONS

Nystad et al., "Adaptive Scalable Texture Compression," High Performance Graphics, Eurographics Association, 2012 (copy in parent apn).

Ellis et al., "ASTC Specification," Jul. 19, 2012, pp. 1-31; retrieved from the Internet: URL:https://github.com/ARM-software/astc-encoder/blob/master/Documentation/ASTC%20Specification%201.0.pdf (copy in parent apn).

* cited by examiner

ASTC INTERPOLATION

CROSS REFERENCE TO RELATED APPLICATIONS AND CLAIM OF PRIORITY

This application is a continuation under 35 U.S.C. 120 of copending application Ser. No. 16/722,584 filed Dec. 20, 2019, which claims foreign priority under 35 U.S.C. 119 from United Kingdom Application No. 1820836.3 filed Dec. 20, 2018.

FIELD

This invention relates to performing interpolation of endpoint values specified according to the Adaptive Scalable Texture Compression (ASTC) format.

BACKGROUND

Textures are used heavily within the field of graphics processing. Textures may be used to represent surface properties, illumination (e.g. within the environment of a scene being imaged) or to apply surface detail to an object being rendered. Textures may require relatively large amounts of memory storage, and texture accesses can contribute a significant proportion of a graphics device's memory bandwidth. As such, it is often desirable to compress texture data.

One texture compression format is known as Adaptive Scalable Texture Compression (ASTC).

In ASTC, a compressed image, or texture, is subdivided into a plurality of data blocks, where each data block represents the texture data for a block of texels forming the texture. Each block of data has a fixed memory footprint (i.e. has a fixed size) of 128 bits. However, the data blocks are capable of representing the texture data for a varying number of texels. The number of texels represented by a single data block may be referred to as the block footprint. The block footprint may be fixed for a given texture. The block footprint's height and width (in texels) are generally selectable from a number of predefined sizes. The footprint may be rectangular, and in some cases the block's footprint may be square. For 2-D textures, examples of block footprints include 4×4 texels; 6×6 texels; 8×8 texels and 12×12 texels (giving compression rates of 8 bits per pixel (bpp); 3.56 bpp; 2 bpp and 0.89 bpp respectively).

The colour of each texel within a block is defined as a point on a linear gradient between a pair of colours. This pair of colours is referred to as a pair of "colour endpoints". Each colour endpoint defines a colour. Each colour endpoint includes one or more components. A colour endpoint may include one, two, three or four components (typically corresponding to R, RG, RGB and RGBA textures respectively).

When decoding a texel, colour values are decoded from the data block and those values are then converted into colour endpoints. The way colour values are converted into colour endpoints is defined by a parameter known as the colour endpoint mode. Information on the colour endpoint mode for a texel is encoded within the data block. The ASTC specification defines 16 possible colour endpoint modes, which vary from computing a colour endpoint from a single colour value up to computing a colour endpoint from four colour values.

In conventional implementations, colours for each texel are calculated by interpolating between a pair of endpoints that are generated from a colour endpoint pair. The endpoints used for interpolation are formed of 16-bit endpoint components, and are generated from respective colour endpoints formed of 8-bit components (for textures encoded using low dynamic range (LDR)) or 12-bit components (for textures encoded using high dynamic range (HDR)). If the endpoints are formed of multiple components, then interpolation between a pair of endpoints involves interpolating between each respective component of the pair of endpoints. An interpolant weight can be used to specify a weighted average of the two endpoints, which corresponds to specifying a position on a linear gradient between the colour endpoints, to thereby define the colour for that texel.

A schematic illustration of the interpolation is shown in FIG. 1A, which shows a pair of colour endpoints A (denoted 104) and B (denoted 106) in a red-blue (RB) colour space denoted 102. In this example, each texel can have one of five weights: 0/4 (corresponding to colour A); ¼; 2/4; ¾; or 4/4 (corresponding to colour B). An example of the texel weights for each texel of a 4 by 4 block is shown in FIG. 1B.

Though shown for the simple example of an RB colour space, the same approach is applied when working in different colour spaces such as RGB or RGBA.

The interpolant weights may be stored in the form of a weight grid, which is a 2-D grid of weight values corresponding to the block of texels represented in the data block. In certain encodings, an interpolant weight may be stored for each texel in the data block (i.e. the dimensions of the weight grid correspond to the dimensions of the block footprint). However, for data blocks that represent texture data for a larger number of texels (e.g. 12×12 texels), there may not be enough data within the block to store an interpolant weight for each texel. In this case, a sparser weight grid may be stored that contains fewer weights than the number of texels within each data block. A weight for each texel in the data block can then be calculated from an interpolation of this sparser weight grid.

In order to do this, the coordinates of a texel within the block are first scaled to the dimensions of the weight grid. The coordinates are scaled by a scale factor that scales the dimensions of the weight grid to the dimensions of the block footprint. The re-scaled position of the texel with respect to the weight grid is then used to select a subset of weights of the weight grid and to interpolate those to calculate a weight for the texel. For example, four weights from the block of adjacent weight grid points around a texel may be selected and interpolated to calculate the weight for the texel.

In certain cases, a single pair of colour endpoints can be used to calculate the colour for each texel within a data block. However, in other cases, a block may represent texels which have a mixture of different colours that cannot reasonably be represented by interpolating between a single pair of colour endpoints. To get around this problem, each texel in the data block can be assigned to one of up to four partitions, where each partition is associated with its own colour endpoint pair. To determine the colour of a texel within the block, the partition that the texel belongs to is determined and the colour calculated from the interpolant weight for that texel and the colour end point pairs associated with the partition. The interpolant weight can be stored and encoded within the data block independently of the colour end point pair (i.e. independently of the partition to which the texel belongs).

This is illustrated schematically in FIGS. 2A and 2B. FIG. 2A shows a first colour endpoint pair 202 formed of endpoint colours A and B, and a second colour endpoint pair 204 formed of endpoint colours C and D within an RB colour space 206. The first endpoint pair belongs to a first partition and the second endpoint pair belongs to a second partition.

Thus in this example there are two partitions. Each colour endpoint pair can be interpolated between with five weights. FIG. 2B shows a block of texels 208 represented by a block of texture data. A partitioning mask is shown overlaid on the block of texels indicating which partition each texel belongs to. The partitioning mask is a grid of values, where each value indicates which partition a texel belongs to. Each value may as such be referred to as a partition index. In particular, a value of 1 indicates a texel belongs to the first partition (associated with colour endpoint pair 202); and a value of 2 indicates a texel belongs to the second partition (associated with colour endpoint pair 204). The weights for each texel are also shown. To determine the colour for a texel, the partition index is used to identify the colour endpoint pair, and the weight is used to interpolate between that pair. For example, texel 210 has a partition index of 1, and a weight of ¾ and thus has a colour defined by the position 212 in RB colour space. Texel 214 has a partition index of 2 and a weight of ¼ and so has a colour defined by the position 216 in RB colour space.

Whilst ASTC can provide an effective way of compressing texture data, the decoding hardware for decoding texture data compressed in accordance with ASTC can often be costly in terms of hardware resources and silicon area.

SUMMARY

According to the present invention there is provided a binary logic circuit for performing an interpolation calculation between two endpoint values $E_0$ and $E_1$ using a weighting index i for generating an interpolated result P, the values $E_0$ and $E_1$ being formed from Adaptive Scalable Texture Compression (ASTC) low-dynamic range (LDR) colour endpoint values $C_0$ and $C_1$ respectively, the circuit comprising:

an interpolation unit configured to perform an interpolation between the colour endpoint values $C_0$ and $C_1$ using the weighting index i to generate a first intermediate interpolated result $C_2$; and combinational logic circuitry configured to receive the interpolated result $C_2$ and to perform one or more logical processing operations to calculate the interpolated result P according to the equation $P=\lfloor((C_2<<8)+C_2+32)/64\rfloor$ when the interpolated result is not to be compatible with an sRGB colour space, and according to the equation $P=\lfloor((C_2<<8)+128.64+32)/64\rfloor$ when the interpolated result is to be compatible with an sRGB colour space.

The interpolation calculation between the two endpoint values $E_0$ and $E_1$ using the weighting index i may be specified according to the equation $p=\lfloor(E_0\cdot(64-i)+E_1\cdot i+32)/64\rfloor$, where p is equal to the interpolated result.

The interpolation unit may comprise an interpolator configured to perform the interpolation between the colour endpoint values $C_0$ and $C_1$ using the weighting index i to generate the interpolated result $C_2$ according to the equation $C_2=C_0\cdot(64-i)+C_1\cdot i$ for non-exception values of i.

The interpolation unit may further comprise exception-handling circuitry configured to generate the interpolated result $C_2$ for exception values of i.

The exception handling circuitry may be configured to generate the interpolated result $C_2$ according to the equation $C_2=C_1\cdot i$ for exception values of i.

The weighting index may comprise 7 bits, and the interpolator may be configured to perform the interpolation between the colour endpoint values $C_0$ and $C_1$ using the 6 least significant bits of the weighting index.

The combinational logic circuitry may comprise:
formatting circuitry configured to generate a second intermediate interpolated result from the set of values $C_0$, $C_1$ and $C_2$ in dependence on whether the interpolated result is to be compatible with an sRGB colour space;
a first logic unit configured to left-shift the second intermediate interpolated result by a number of bits equal to the number of bits of each of the colour endpoint values $C_0$ and $C_1$ and to add to the shifted result a constant to generate a third intermediate interpolated result; and
a second logic unit configured to add the second intermediate interpolated result to the third interpolated result if the interpolated result is not to be compatible with the sRGB colour space.

The combinational logic circuitry may further comprise a right-shifter configured to right-shift the output of the second logic unit by a specified number of bits to generate the interpolated result.

The specified number of bits may be equal to 6.

The first logic unit may be configured to left-shift the second intermediate interpolated result by 8 bits and to add a numerical constant of 32 to generate the third intermediate interpolated result.

The formatting circuity may be configured to generate the second intermediate interpolated result as: (i) the first intermediate interpolated result $C_2$ when the interpolated result is not to be compatible with an sRGB colour space; (ii) the summation of the first intermediate interpolated result $C_2$ and a numerical constant when the interpolated result is to be compatible with an sRGB colour space.

The formatting circuity may be configured to generate the second intermediate interpolated result as: (i) the interpolated result $C_2$ output from the interpolator when the interpolated result is not to be compatible with an sRGB colour space and the value of the weighting index is not equal to an exception value; (ii) the summation of the interpolated result $C_2$ output from the interpolator and a numerical constant when the interpolated result is to be compatible with an sRGB colour space and the value of the weighting value is not equal to an exception value; (iii) the interpolated result $C_2$ output from the exception-handling circuity when the interpolated result is not to be compatible with an sRGB colour space and the value of the weighting index is equal to an exception value; and iv) the summation of the interpolated result $C_2$ output from the exception-handling circuity and a numerical constant when the interpolated result is to be compatible with an sRGB colour space and the value of the weighting value is equal to an exception value.

The formatting circuitry may comprise:
a selection unit configured to select between (i) a first input dependent on the interpolated result $C_2$ output from the exception handling circuitry; and (ii) a second input dependent on the interpolated result $C_2$ output from the interpolator, in dependence on whether the value of the weighting index is equal to an exception value.

The formatting circuitry may comprise a logic unit configured to add a non-zero numerical constant to its received inputs only if the interpolated result is to be compatible with an sRBG colour space.

The input to the logic unit may be the output of the selection unit.

The inputs to the logic unit may be the interpolated result $C_2$ output from the exception-handling circuity, and the interpolated result $C_2$ output from the interpolator.

The first input to the selection unit may be the interpolated result $C_2$ output from the exception-handling circuitry and the second input to the selection unit is the interpolated result $C_2$ output from the interpolator.

According to a second aspect of the present disclosure there is provided a method of using a binary logic circuit to interpolate between two endpoint values $E_0$ and $E_1$ using a weighting index i for generating an interpolated result P, the values $E_0$ and $E_1$ being formed from Adaptive Scalable Texture Compression (ASTC) low-dynamic range (LDR) colour endpoint values $C_0$ and $C_1$ respectively, the method comprising:

performing at an interpolation unit of the binary logic circuit an interpolation between the colour endpoint values $C_0$ and $C_1$ using the weighting index i to generate a first intermediate interpolated result $C_2$;

receiving at combinational logic circuitry of the binary logic circuit the interpolated result $C_2$, and performing one or more logical processing operations to calculate the interpolated result P according to the equation $P=\lfloor((C_2<<8)+C_2+32)/64\rfloor$ when the interpolated result is not to be compatible with an sRGB colour space, and according to the equation $P=\lfloor((C_2<<8)+128.64+32)/64\rfloor$ when the interpolated result is to be compatible with an sRGB colour space.

The interpolation calculation between the two endpoint values $E_0$ and $E_1$ using the weighting index i may be specified according to the equation $p=\lfloor(E_0\cdot(64-i)+E_1\cdot i+32)/64\rfloor$, where p is equal to the interpolated result.

The step of performing the interpolation at the interpolation unit may comprise using the weighting index i to generate using an interpolator the interpolated result $C_2$ according to the equation $C_2=C_0\cdot(64-i)+C_1\cdot i$ for non-exception values of i.

The step of performing the interpolation at the interpolation unit may further comprise generating at exception-handling circuitry the interpolated result $C_2$ for exception values of i.

The interpolated result for exception values of i may be generated according to the equation $C_2=C_1\cdot i$.

The step of performing one or more logical processing operations may comprise:

generating at a formatting unit a second intermediate interpolated result from the set of values $C_0$, $C_1$ and $C_2$ in dependence on whether the interpolated result is to be compatible with an sRGB colour space;

left-shifting the second intermediate interpolated result by a number of bits equal to the number of bits of each of the colour endpoint values $C_0$ and $C_1$ and adding to the shifted result a constant to generate a third intermediate interpolated result; and adding the second intermediate interpolated result to the third interpolated result if the interpolated result is not to be compatible with the sRGB colour space.

The step of performing one or more logical processing operations may further comprise:

right-shifting the output of the second logic unit by a specified number of bits to generate the interpolated result.

The method may comprise left-shifting the second intermediate interpolated result by 8 bits and adding a numerical constant of 32 to generate the third intermediate interpolated result.

The second intermediate interpolated result may be generated as: (i) the first intermediate interpolated result $C_2$ when the interpolated result is not to be compatible with an sRGB colour space; (ii) the summation of the first intermediate interpolated result $C_2$ and a numerical constant when the interpolated result is to be compatible with an sRGB colour space.

The second intermediate interpolated result may be generated as: (i) the interpolated result $C_2$ generated by the interpolator when the interpolated result is not to be compatible with an sRGB colour space and the value of the weighting index is not equal to an exception value; (ii) the summation of the first interpolated result $C_2$ generated by the interpolator and a numerical constant when the interpolated result is to be compatible with an sRGB colour space and the value of the weighting value is not equal to an exception value; (iii) the interpolated result $C_2$ generated by the exception-handling circuity when the interpolated result is not to be compatible with an sRGB colour space and the value of the weighting index is equal to an exception value; and iv) the summation of the interpolated result $C_2$ generated by the exception-handling circuity and a numerical constant when the interpolated result is to be compatible with an sRGB colour space and the value of the weighting value is equal to an exception value.

The binary logic circuit may be embodied in hardware on an integrated circuit.

There may be provided an integrated circuit definition dataset that, when processed in an integrated circuit manufacturing system, configures the integrated circuit manufacturing system to manufacture a binary logic circuit according to any of the examples herein.

There may be provided an integrated circuit manufacturing system configured to manufacture a binary logic circuit according to any of the examples herein.

There may be provided a manufacturing, using an integrated circuit manufacturing system, a binary logic circuit according to any of the examples herein.

There may be provided a method of manufacturing, using an integrated circuit manufacturing system, a binary logic circuit according to any of the examples herein, the method comprising:

processing, using a layout processing system, a computer readable description of the graphics processing system so as to generate a circuit layout description of an integrated circuit embodying the binary logic circuit; and manufacturing, using an integrated circuit generation system, the binary logic circuit according to the circuit layout description.

There may be provided computer program code for performing a method according to any of the examples herein.

There may be provided non-transitory computer readable storage medium having stored thereon computer readable instructions that, when executed at a computer system, cause the computer system to perform the method according to any of the examples herein.

There may be provided a non-transitory computer readable storage medium having stored thereon a computer readable description of a binary logic circuit according to any of the examples herein that, when processed in an integrated circuit manufacturing system, causes the integrated circuit manufacturing system to manufacture an integrated circuit embodying the binary logic circuit.

There may be provided a computer readable storage medium having stored thereon a computer readable description of a binary logic circuit according to any of the examples herein which, when processed in an integrated circuit manufacturing system, causes the integrated circuit manufacturing system to:

process, using a layout processing system, the computer readable description of the binary logic circuit so as to generate a circuit layout description of an integrated circuit embodying the binary logic circuit; and manufacture, using an integrated circuit generation system, the binary logic circuit according to the circuit layout description.

There may be provided an integrated circuit manufacturing system comprising:

a non-transitory computer readable storage medium having stored thereon a computer readable description of a binary logic circuit according to any of the examples herein;

a layout processing system configured to process the computer readable description so as to generate a circuit layout description of an integrated circuit embodying the binary logic circuit; and an integrated circuit generation system configured to manufacture the binary logic circuit according to the circuit layout description.

BRIEF DESCRIPTION OF DRAWINGS

The present invention will now be described by way of example with reference to the accompanying drawings. In the drawings.

DETAILED DESCRIPTION

Figures 1A, 1B:
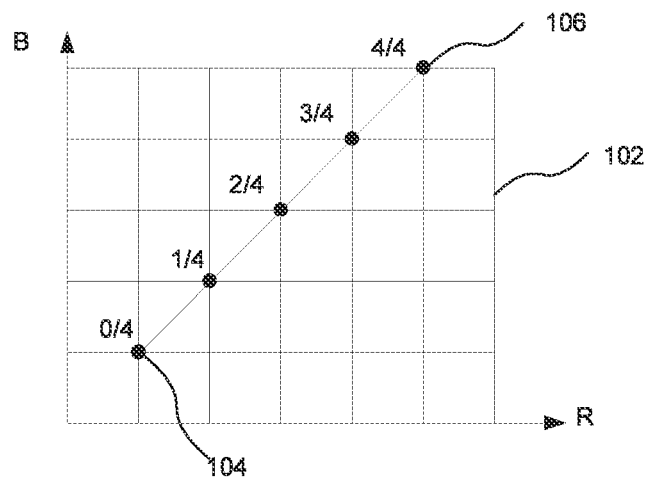
FIG. 1A shows a colour endpoint pair located within an RB colour space.
FIG. 1B shows a 4 by 4 block of texels and a grid of weights indicating the weight for each texel used to interpolate between a colour endpoint pair.
Figure 2A:
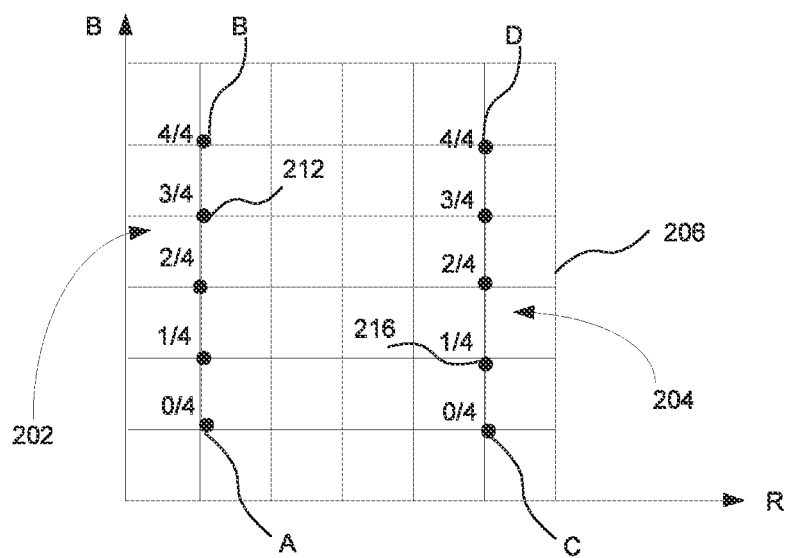
FIG. 2A shows two colour endpoint pairs located within an RB colour space.
Figure 2B:
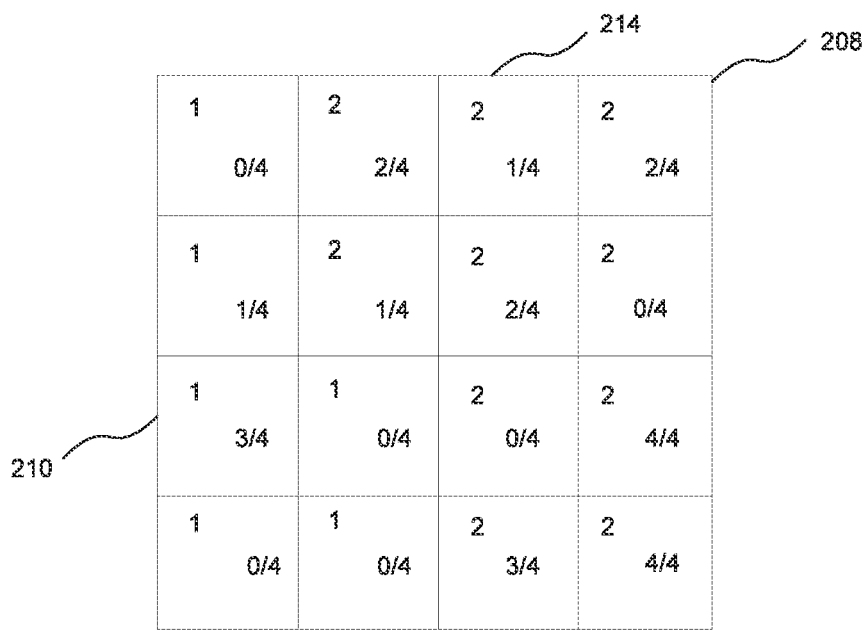
FIG. 2B shows a 4 by 4 block of texels with a partition mask indicating the partition index of each texel and a weight grid indicating the weight for each texel.

The present disclosure is directed to interpolation units for interpolating between a pair of endpoints specified according to the Adaptive Scalable Texture Compression (ASTC) format. The interpolation units can interpolate between a pair of endpoints to calculate a colour value for a texel encoded according to the ASTC format. Example interpolation units are described that are optimised to support only the interpolation of endpoints for texels encoded using low dynamic range (LDR). Example interpolation units are also described that are optimised to support the interpolation of endpoints for texels encoded using either low dynamic range (LDR) or high dynamic range (HDR).

As described above, endpoints of each endpoint pair may comprise one or more (e.g. up to four) endpoint components. Conventionally, the interpolation between two endpoint components $E_0$ and $E_1$ according to the ASTC format is calculated according to the equation:

$$P = \lfloor (E_0 \cdot (64-i) + E_1 \cdot i + 32)/64 \rfloor \qquad (1)$$

where P is the calculated interpolated result and i is the weighting index.

The endpoint components $E_0$ and $E_1$ are each 16-bit unsigned normalised integers (i.e., 16-bit UNORM values). Each endpoint component $E_0$ and $E_1$ is formed from colour endpoint components $C_0$ and $C_1$ respectively. Each colour endpoint component may be either an 8-bit UNORM value (for LDR endpoints) or a 12-bit UNORM value (for HDR endpoints). Conventional ASTC interpolator units that interpolate between the 16-bit endpoint components $E_0$ and $E_1$ using the weighting index i therefore typically require an interpolator capable of interpolating between two 16-bit values.

However, it has been appreciated that the interpolated result P can be calculated by instead interpolating between the lower-bit colour endpoint components $C_0$ and $C_1$ using the weighting index i to generate an intermediate interpolated result, and then performing logical processing operations on that intermediate result to calculate the result P. The interpolation units described herein include an interpolator to interpolate between the components $C_0$ and $C_1$ to generate the intermediate result, and additional combinational logic circuitry to convert that intermediate result to the interpolation result P. By performing the interpolation between the lower-bit colour endpoint components $C_0$ and $C_1$ rather than the 16-bit values $E_0$ and $E_1$, the size of the interpolator and the time taken to perform the interpolation may be reduced. Though additional logical processing operations are performed to convert the intermediate interpolated result to the interpolated result P, it has been found that these can be performed by relatively cheap (in terms of size and additional processing time) logic components, meaning the interpolation units described herein can benefit from savings in circuitry size and processing time compared to conventional interpolation units. This will be explained in more detail below.

As used herein, like reference numerals denote like components.

Figure 3:
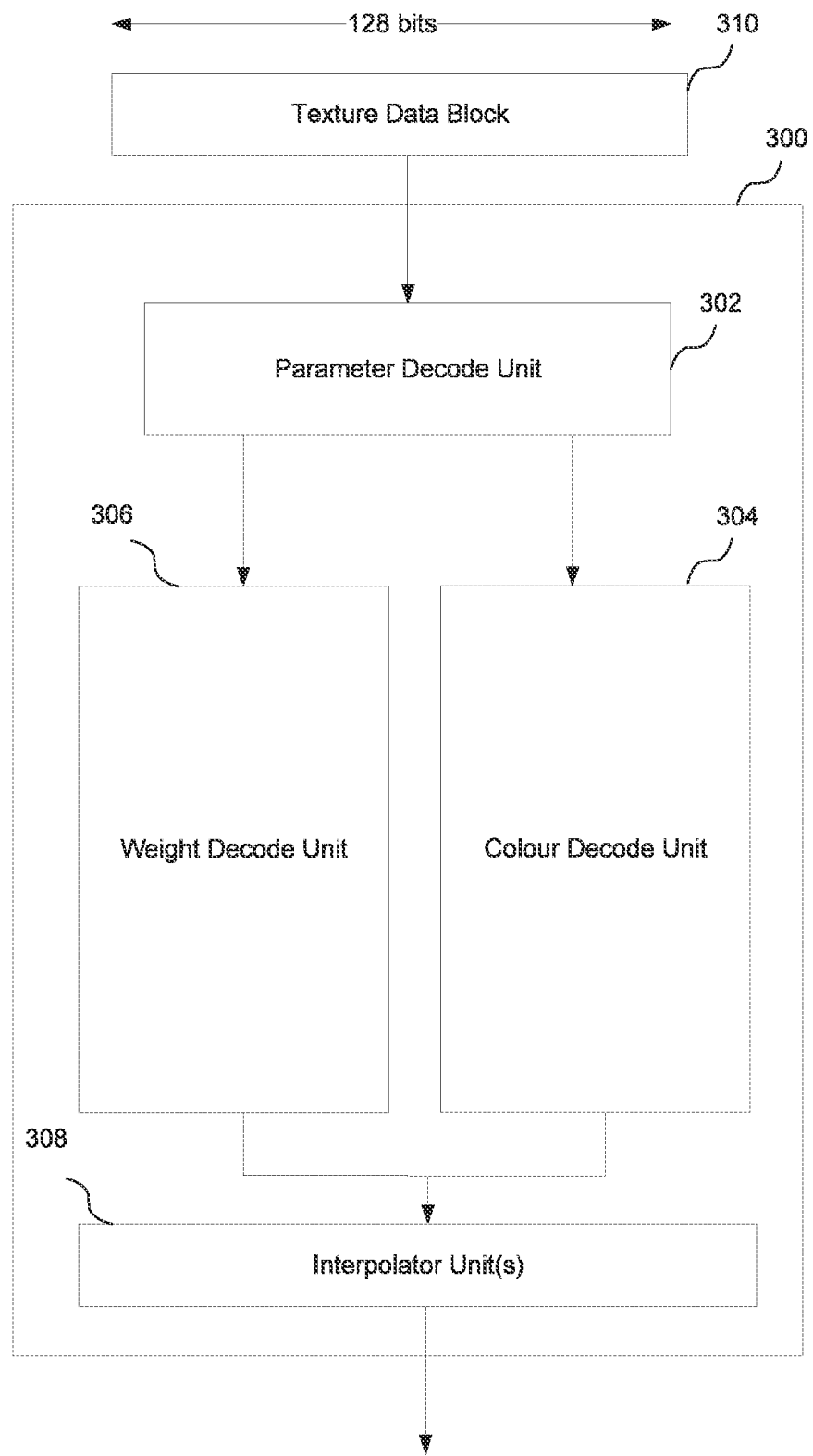
FIG. 3 shows a multi-output decoder for decoding a plurality of texels from a block of data compressed according to the ASTC specification.

FIG. 3 shows a schematic illustration of a decoder unit 300 for decoding a texel from a block of texture data encoded according to an ASTC format.

The decoder comprises a parameter decode unit 302, a colour decode unit 304, a weight decode unit 306 and at least one interpolation unit 308. The parameter decode unit is coupled to the colour decode unit and the weight decode unit. In particular, an output of the parameter decode unit is coupled to an input of both the weight decode unit and colour decode unit. Each of the colour decode unit and the weight decode unit are coupled to the at least one interpolation unit. More specifically, an output of the weight and colour decode units is coupled to an input of the interpolation unit(s).

The decoder 300 is configured to receive as an input a block of ASTC-encoded texture data, shown at 310. As mentioned above, the block has a size, or memory footprint, of 128 bits. The texture data block 310 encodes texel colours for an n by m block of texels. That n by m block of texels may form part of a compressed image, or texture. The texture may be composed of a plurality of such texture blocks, with each of those blocks being encoded in a respective 128-bit data block. The number of texels represented by block of texture data is referred to as the block footprint. The dimensions of the block (i.e. the values of n and m) are selectable from a number of fixed alternatives specified by the ASTC standard.

The decoder operates to decode texels from the texture block 310. The decoder may operate to decode the texels according to a decoding process. That decoding process may comprise a series of decoding steps, or operations. The series of steps undergone to decode a particular texel may be referred to as a decoding pipeline. Thus, the decoder 300 may operate to decode texels from block 310, where each texel is decoded according to decoding pipeline.

Figure 4:
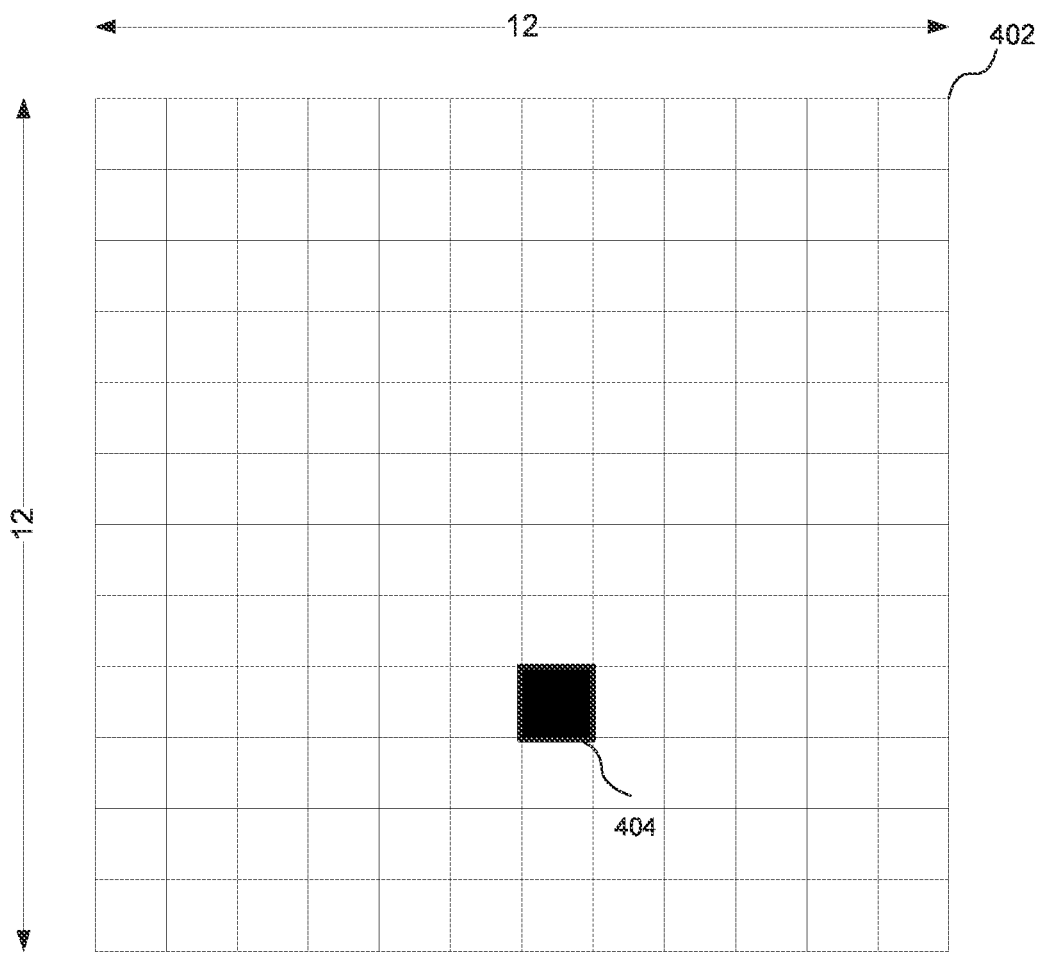
FIG. 4 shows the block footprint for a block of texture data and a sub-block of texels to be decoded from that block.

In the following example, for the purposes of illustration the block of texture data 310 represents a 12 by 12 block of texels (illustrated in FIG. 4 at 402). A texel to be decoded is shown at 404 for the purpose of illustration.

The parameter decode unit 302 receives the data block 310. The parameter decode unit operates to decode configuration data for the block 310. The configuration data may be data that specifies parameters of the texture data and its encoding within the block 310. The configuration data could include, for example: the size of the weight grid and/or the range of the weight values; the partition count (i.e. the number of partitions for the data block 310) and the colour endpoint modes (including an indication of whether the endpoint modes are LDR or HDR).

Figure 5:
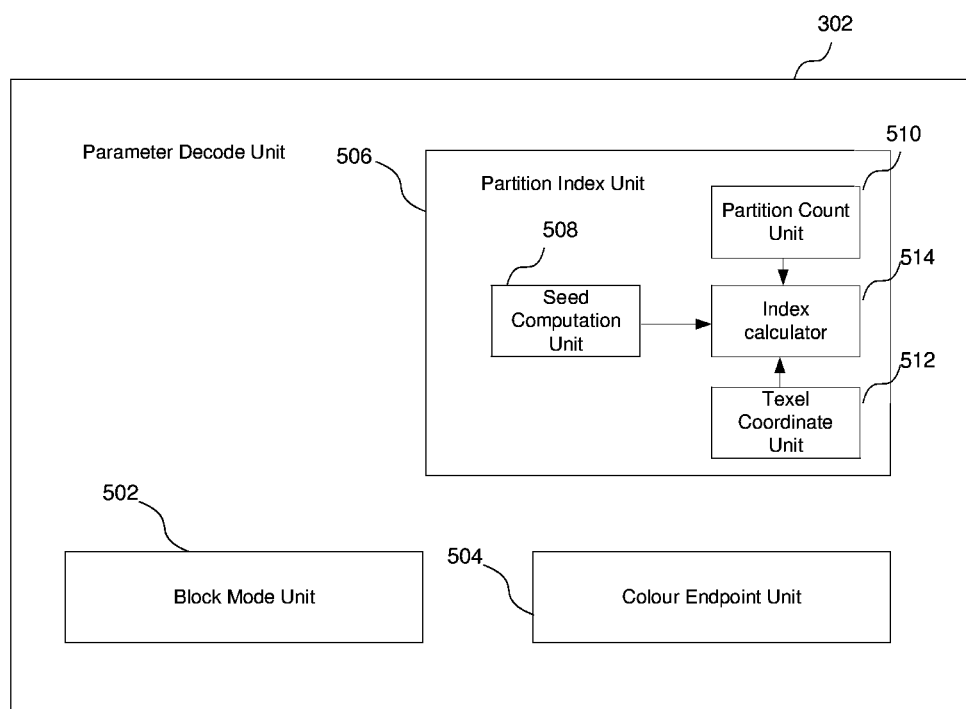
FIG. 5 shows an example structure of a parameter decode unit forming part of the decoder shown in FIG. 3.

An example of the parameter decode unit 302 is shown in more detail in FIG. 5. As shown, the parameter decode unit 302 comprises a block mode unit 502; a colour endpoint unit 504 and a partition index unit 506.

The block mode unit 502 is configured to decode a portion of the configuration data including the weight grid size (its height and width, i.e. its dimensions) and the range of weight values that can be occupied by the weights of the weight grid.

The partition index unit 506 is configured to calculate a partition index for the texel to be decoded from the data block 310. The partition index identifies which partition the texel belongs to, and is an example of a configuration parameter.

The partition index for each texel is computed from a seed, the partition count and the coordinate of the texel within the texel block 402. The seed, partition count and texel coordinates may be referred to as intermediate configuration data since they are examples of data that are used in order to decode a configuration parameter (the partition index), but are themselves not configuration parameters. The partition count is decoded from the data block 310 by a partition count unit 510 that forms part of the partition index unit 506. The seed is computed by a seed computation block 508 from a partition pattern index decoded from the data block 310. The coordinates of the texels are computed by a texel coordinate unit (TCU) 512. The TCU 212 may comprise hardware for calculating the coordinates of the texel 404 being decoded. The partition index unit comprises an index calculator 514 for calculating the partition index from the seed, partition count and texel coordinates. The index calculator calculates a partition index for texel 404 being decoded.

The colour endpoint unit 504 is configured to decode the colour endpoint modes from the data block 310. In the case that the texture data has a partition count greater than one (i.e. there are multiple partitions), the colour endpoint unit may decode the colour endpoint mode for each partition. As described above, the colour endpoint modes specify how colour values decoded from the block 310 are to be converted into colour endpoints. In general, the ASTC specification specifies 16 possible colour endpoint modes, where the modes require differing numbers of colour values to form a colour endpoint. In particular, four of the modes form a single colour endpoint from a single colour value (e.g. luminance), and thus require two colour values for each colour endpoint pair; four of the modes form a single colour endpoint from two colour values, and thus require four colour values for each colour endpoint pair; four of the modes require three colour values to form each colour endpoint, and thus require 6 colour values for each colour endpoint pair; and four of the modes require four colour values to form a single colour endpoint (e.g. RGBA), and thus require 8 colour values for each colour endpoint pair.

The colour decode unit 304 decodes colour endpoint data for the texel 404 being decoded from the data block 310 using the configuration data decoded from the data block 310. The colour endpoint data includes the colour endpoint pair for texel 404 being decoded. If the block of data 310 has a partition count of one, then each of the texels to be decoded is associated with the same colour endpoint pair. The colour endpoint data may include up to eight colour endpoints forming four colour endpoint pairs (for a partition count of four—i.e. one colour endpoint pair per partition). One or more of the colour endpoint pairs may be associated with multiple texels of the group of texels to be decoded from the data block 310; i.e. some of the texels to be decoded may share a common colour endpoint pair.

Figure 6:
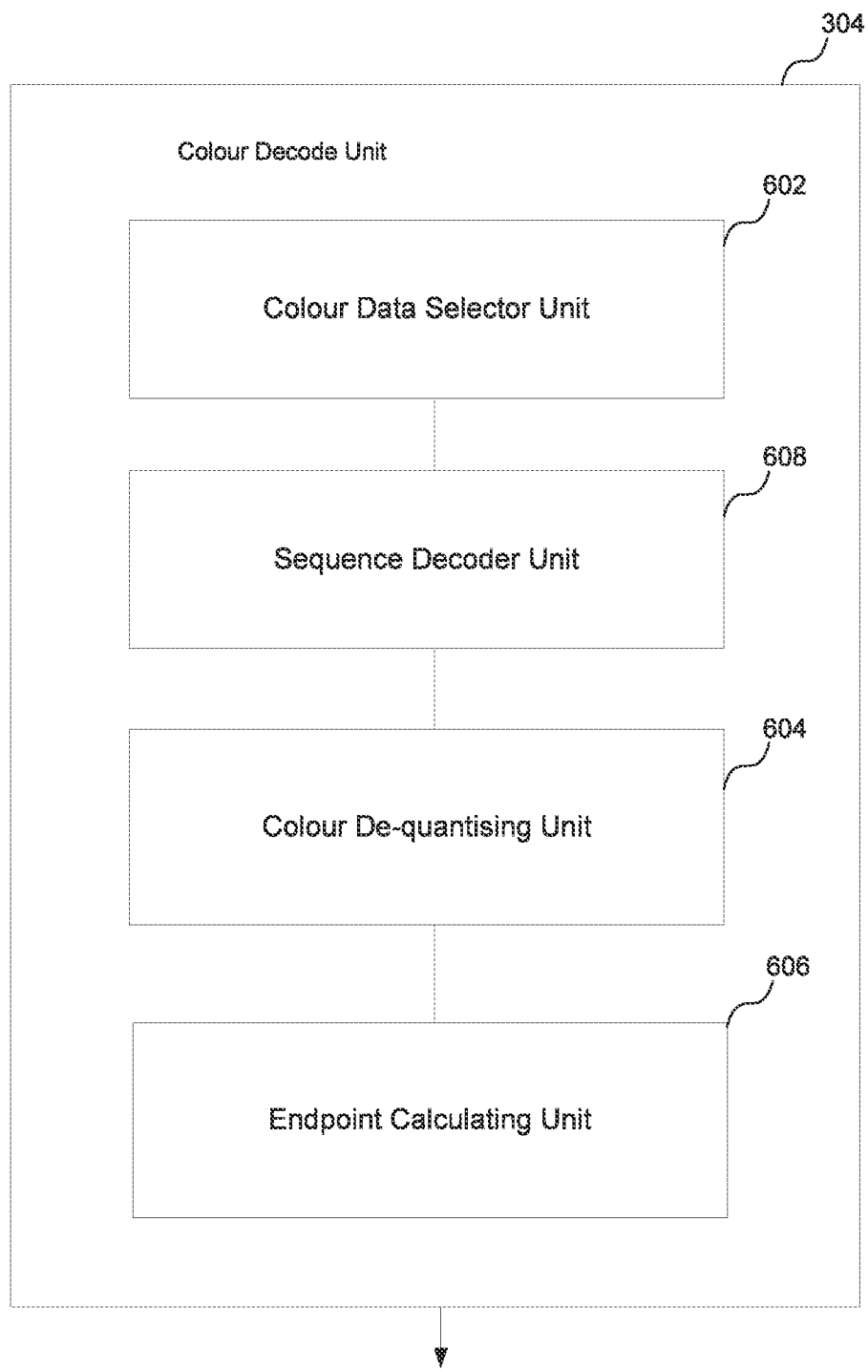
FIG. 6 shows an example structure of a colour decode unit forming part of the decoder shown in FIG. 3.

An example structure of the colour decode unit 304 is shown in FIG. 6. The colour decode unit comprises a colour data selector unit (CDSU) 602, a sequence decoder unit 608, a colour de-quantising unit 604 and a colour endpoint calculation unit 606.

The CDSU 602 is configured to determine the size of the colour data within the data block 310, i.e. the size of the data within the block 310 used to represent the colour endpoints. In ASTC, the colour data is encoded within a data block as a variable length bit string. The colour data is encoded according to a bounded integer sequence encoding (BISE) scheme. The size of the colour data can be determined from the partition count (decoded by the partition count unit 510) and the block mode data decoded by the block mode unit 502. The CDSU 602 may also decode the location of the colour data within the data block 310. This information may again be determined from the partition count and the block mode data.

The sequence decoder unit 608 is configured to perform integer sequence decoding of the colour data. As mentioned above, the colour data is encoded within a data block according to a binary integer sequence encoding (BISE) scheme. The use of the BISE scheme enables colour values to be encoded in a fractional number of bits. A sequence of values can be represented using trits (base-3 representation) or quints (base-5 representation). Other base representations may also be used.

The colour de-quantising unit 604 is configured to extract the colour values from the decoded colour data and to de-quantise those colour values.

The endpoint calculation unit 606 is configured to convert the de-quantised colour values decoded by the de-quantising unit 604 into a set of colour endpoints. The endpoint calculation unit 606 may calculate the pair of colour endpoints for each given texel using the partition index and associated colour endpoint mode for that texel.

The endpoint calculation unit 606 may output the pair of colour endpoints for the texel being decoded from the block 310. To do this, the endpoint calculation unit 606 may select an endpoint pair from the set of colour endpoints using the partition index for the texel being decoded. Alternatively, it may output the colour endpoints for each partition and a partition index for the texel.

The weight decode unit 306 decodes interpolation weight data for the texel being decoded from the block 310 using the configuration data decoded by the parameter decode unit 302. Thus, the weight decode unit may decode a weight for each texel being decoded from the block 310. These weight values are received by the interpolation unit(s) 308. The weight value for a given texel is denoted herein as i, and may also be referred to as a weight index. The range of weight values in ASTC may vary in principle but is typically limited to 0 to 64. The weight index may therefore be formed of any specified number of bits but is typically limited to seven bits (the minimum number of bits needed to represent the value 64).

Figure 7:
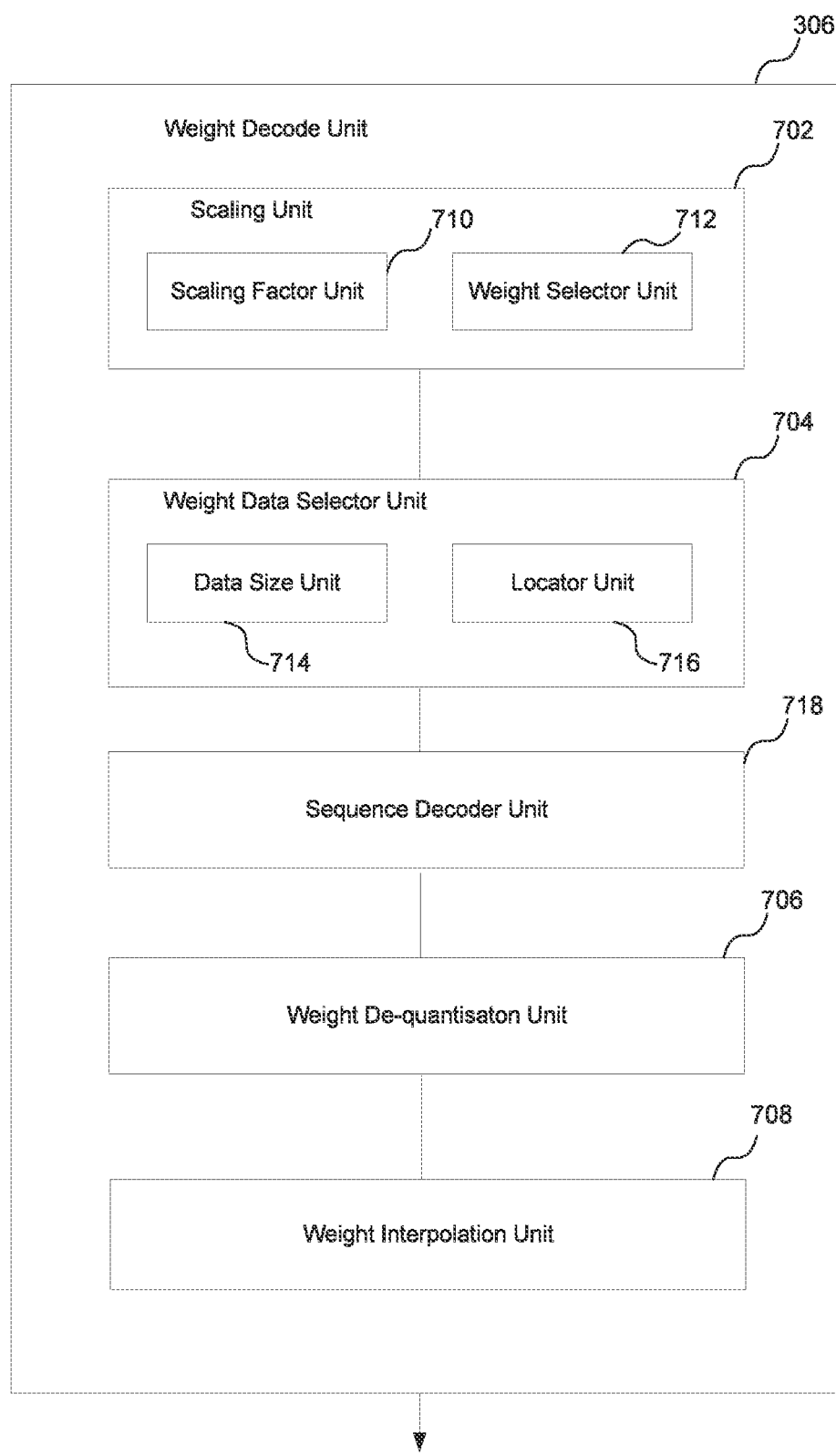
FIG. 7 shows an example structure of a weight decode unit forming part of the decoder shown in FIG. 3.

FIG. 7 shows an example internal structure for the weight decode unit 306. Here, the weight decode unit comprises a scaling unit 702; a weight data selector unit (WDSU) 704; a sequence decoder unit 718, a weight de-quantisation unit 706 and a weight interpolation unit 708. The scaling unit 702 is coupled to the WDSU 704; the WDSU is coupled to the de-quantising unit 706 and the de-quantising unit is coupled to the weight interpolation unit 708.

The scaling unit 702 is configured to identify weights of the weight grid to be used in an interpolation so as to generate the weight index i for the texel 404 being decoded. The scaling unit 702 may identify a set of weights from the weight grid for the texel being decoded. Each set of weights can then be interpolated by unit 708 to generate the final weight index i for the texel.

As described above, depending on the size of the block footprint a weight may not be explicitly stored for each texel represented by the data block 310. For larger block footprints (e.g. 12 by 12 texels), the weight grid is of a sparser resolution than the block dimensions. In such cases, in order to derive a weight for each texel, the texel's coordinates are scaled to the dimensions of the weight grid and then a weight interpolation is performed for each texel in order to calculate a final weight for those texels.

The scaling unit 702 comprises a scaling factor unit 710 and a weight selector unit 712. The scaling factor unit 710 decodes the scaling factor that scales the size of the weight grid to the size of the block footprint from the data block 310. The weight selector unit 712 uses the scaling factor to scale the coordinates of the texel 404 being decoded to the weight grid and to select the weights of the weight grid to be used in an interpolation to calculate the final weight index i for the texel. The same scale factor as calculated by scale factor unit 710 is used by the weight selector unit 712 to scale the coordinates of the texel 404.

Figure 8:
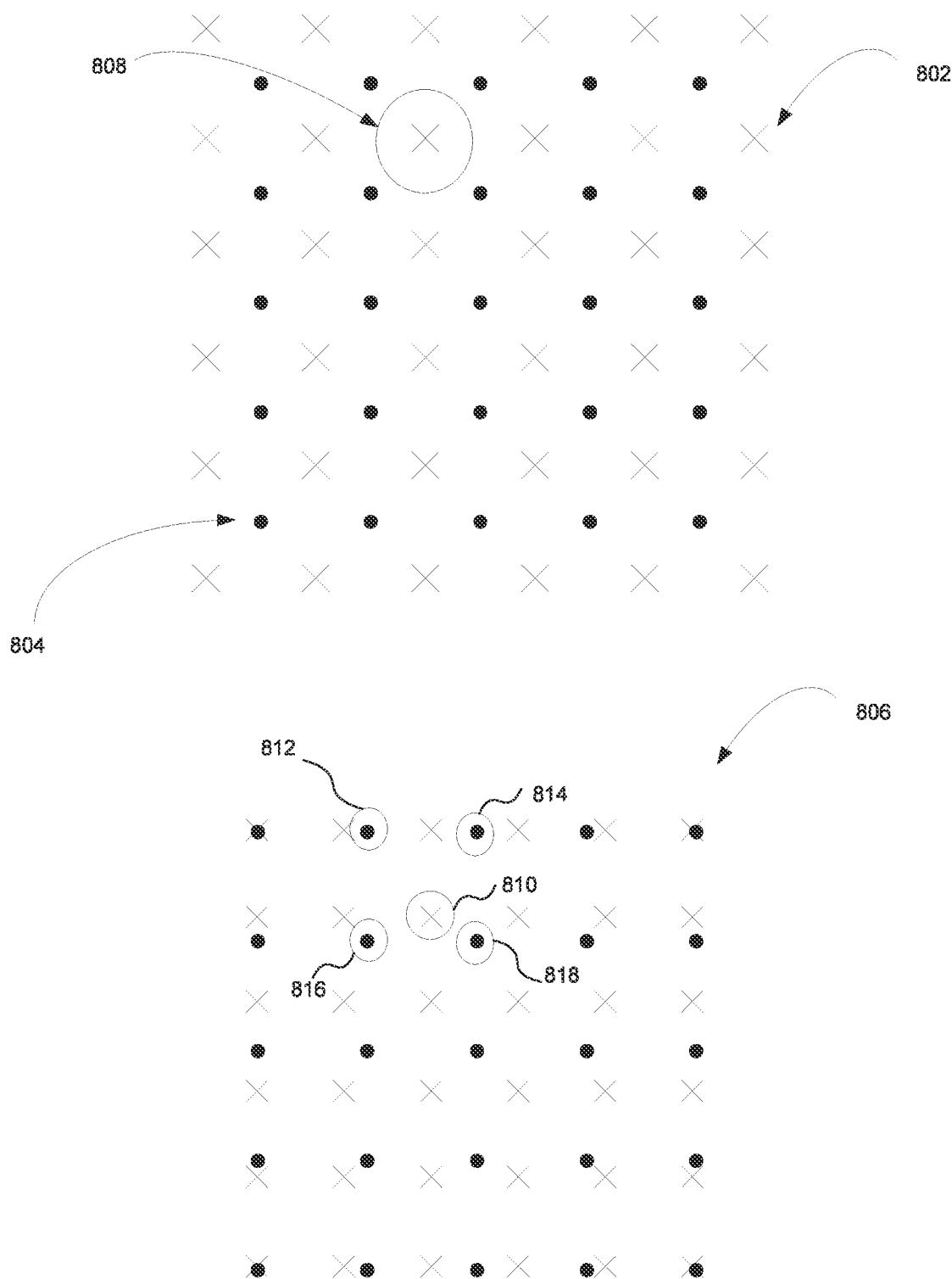
FIG. 8 shows an illustration of how coordinates of a texel within a block can be rescaled to the dimensions of a weight grid.

This process is illustrated schematically in FIG. 8. A 6 by 6 block footprint of texels is shown by the 'cross' markings (denoted generally at 802) and a 5 by 5 weight grid is shown by the 'dot' markings and denoted generally at 804. The weight grid is therefore of a lower resolution than the dimensions of the block footprint. The block footprint and the weight grid are shown overlapped with each other for the purposes of illustration. A scaling factor is then applied to the coordinates of the texels to re-scale the block footprint to the dimensions of the weight grid. The result of applying this scale factor is shown generally at 806. In this example the scaling factor has been applied to all the texels in the block footprint (rather than just the selected texel being decoded) for the purposes of illustration. The re-scaled texel coordinates are then used to select a set of weights of the weight grid to interpolate in order to calculate a final weight index for each texel. For example, the coordinates of some texel A (circled for identification) are re-scaled from position 808 to position 810. The set of weights 812, 814, 816 and 818 are then selected for interpolation to generate a final weight index for texel A using the re-scaled position of that texel with respect to the weight grid.

The weight data selector unit 704 determines the size of the weight data within the block and the location of the data for the selected weights of the weight grid to be used in the weight interpolation for the texel being decoded.

The WDSU comprises a weight data size unit 714 and a weight locator unit 716. The data size unit 714 is configured to determine the size of the weight data within the block 310. The data size unit 714 determines this based on the weight value ranges and the size of the weight grid as decoded by the block mode unit 502.

The weight locator unit 716 is configured to locate the weight data within the block 310 for each set of weights to be used in the weight interpolation for the texel 404 being decoded.

Like the colour data, the weight data may also be BISE encoded. The sequence decoder unit 718 is configured to perform binary integer sequence decoding of the weight data.

The weight de-quantization unit 706 is configured to de-quantise the decoded set of weights for texel 404 (that is, return each of the weights to their original range from their encoded range).

The weight interpolation unit 708 is configured to interpolate the set of weights for the texel 404 being decoded to calculate for that texel the final interpolation weight index i (e.g. a final interpolation weight per plane for the texel).

The final weight index i for the texel 404 being decoded is then output from the weight decode unit 306.

The interpolation unit(s) 308 calculate a colour value for the texel 404 being decoded using the colour endpoint data for the texel calculated by unit 306 and the weight index i for the texel calculated by the unit 304.

Examples of the interpolation unit 308 will now be described. The examples are broadly classified into two groups: a first group that supports only an LDR mode of operation, and a second group that supports both an LDR and HDR mode of operation. The example interpolation units supporting only an LDR mode of operation will be described first.

LDR Mode Only

Figure 9:
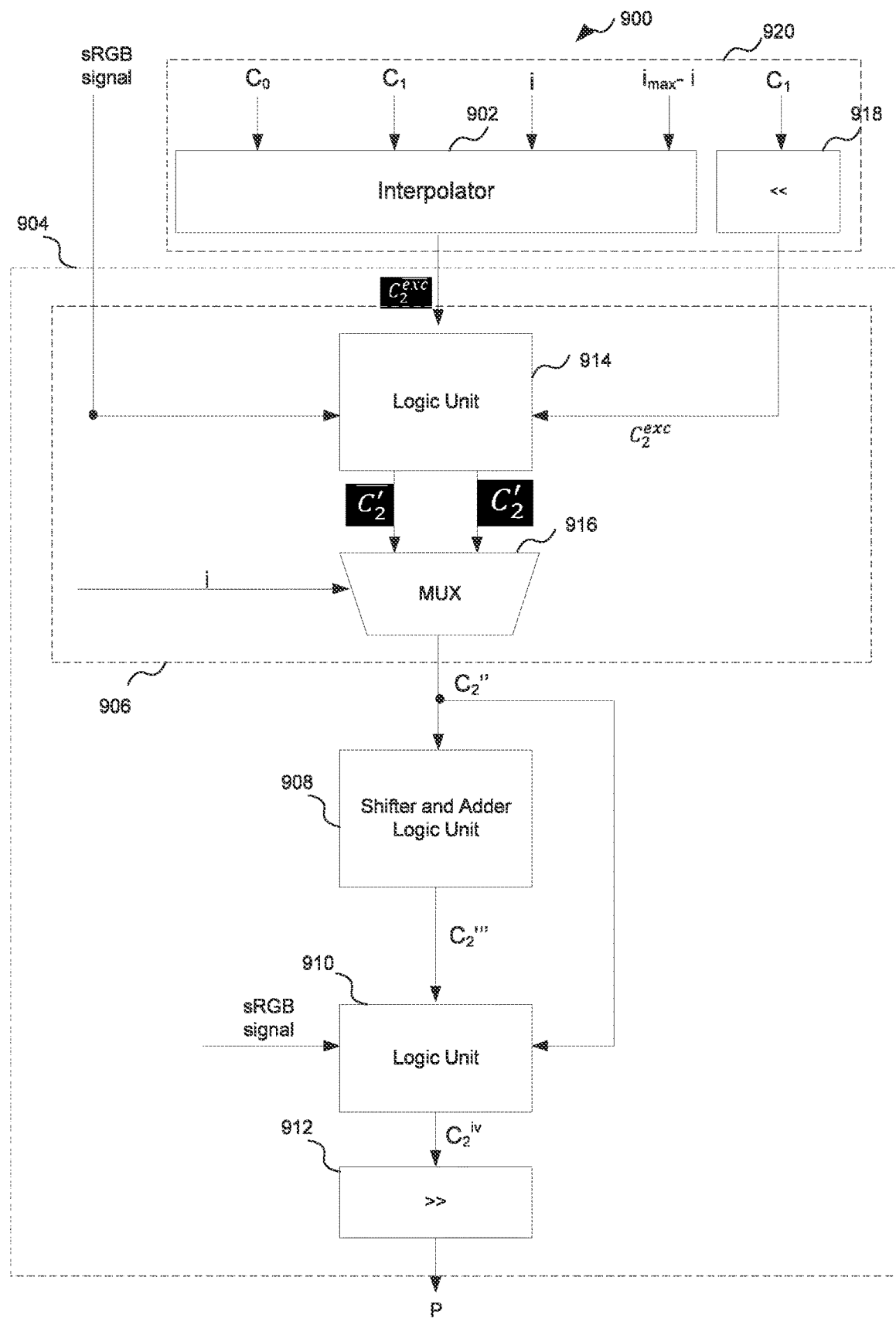
FIG. 9 shows an example of an interpolation unit supporting LDR inputs forming part of the decoder shown in FIG. 3.

FIG. 9 shows an example structure of an interpolation unit 900. The interpolation unit 900 supports only an LDR mode of operation; i.e. it is configured to only operate on LDR inputs.

The interpolation unit is in the form of a binary logic circuit that operates on binary inputs. The binary logic circuit comprises an interpolation 920 and combinational logic circuitry 904. The interpolation unit 920 comprises an interpolator 902 and exception-handling circuitry 918. The combinational logic circuitry 904 comprises formatting circuitry 906; a shifter and adder logic unit 908; an additional logic unit 910 and a shifter 912. The binary logic circuit 900 is configured to calculate an interpolation between endpoint components $E_0$ and $E_1$ using weighting index i output from the weight decode unit 306 to form an interpolated result, P. The value of P is as specified above by equation (1), repeated here for reference:

$$P = \lfloor (E_0 \cdot (64-i) + E_1 \cdot i + 32)/64 \rfloor \qquad (1)$$

Each of components $E_0$ and $E_1$ are components of a respective endpoint that form an endpoint pair. In the context of this example, that endpoint pair is the endpoint pair for texel 404 being decoded. The weight index i is the weight index for the texel 404. The interpolated result may be, or more generally may be indicative of, a colour component value for the texel 404.

Endpoint components $E_0$ and $E_1$ are formed from LDR colour endpoint components $C_0$ and $C_1$ respectively for the texel 404 determined by the colour decode unit 304. In particular, endpoint component $E_0$ is formed from an expansion of colour endpoint component $C_0$, and endpoint component $E_1$ is formed from an expansion of colour endpoint component $C_1$. As mentioned above, the endpoint components $E_0, E_1$ represent 16-bit UNORM values and the LDR colour endpoint components $C_0, C_1$ represent 8-bit UNORM values. Thus, to clarify, it is noted that the values $E_0$, $E_1$, $C_0$, $C_1$ and i are unsigned binary integers.

Interpolation unit 920 is configured to receive as inputs the colour endpoint components $C_0$ and $C_1$ for the texel 404, the weight index i for the texel and, optionally, the value $i_{max}-i$, where $i_{max}$ is the maximum value of the weight index permitted by the specified range. As described above, that maximum value is typically 64. In an alternative arrangement, the interpolator may calculate the value of $i_{max-i}$ from the received index i and knowledge of the value $i_{max}$.

In contrast to conventional ASTC decoders, interpolation unit 920 does not perform an interpolation using the expanded 16-bit endpoint components $E_0$ and $E_1$, but instead performs an interpolation between the 8-bit values $C_0$ and $C_1$ using the weighting index i to form an intermediate interpolation result. This interpolation is performed using the interpolator 902 for non-exception values of the weighting index i, and by the exception-handling circuitry 918 for exception values of i. The combinational logic circuitry 904 operates to generate the final interpolated result P from this intermediate result. This will now be explained in more detail.

The ASTC standard specifies that, for LDR inputs, interpolated results (e.g. colour values for texels) may either be compatible with an sRGB colour space or incompatible with the sRGB colour space. Compatible with the sRGB colour space may mean that the interpolated result can be converted to the sRGB colour space, and incompatible with the sRGB colour space may mean that the interpolated result cannot be correctly converted to the sRGB colour space. Compatibility of an interpolated result with the sRGB colour space may equivalently be expressed by saying that conversion to the sRGB colour space is enabled; and incompatibility with the sRGB colour space may equivalently be expressed by saying that conversion to the sRGB colour space is not enabled (i.e. is disabled). The ASTC standard specifies that, when conversion of a decoded colour value to the sRGB colour space is disabled, the colour endpoint components $C_0$ and $C_1$ are expanded to $E_0$ and $E_1$ respectively by bit replication, i.e.

$$E_0 = (C_0 << 8) | C_0 = C_0 \sqcup C_0 \qquad (2)$$

$$E_1 = (C_1 << 8) | C_1 = C_1 \sqcup C_1 \qquad (3)$$

In equations (2) and (3), << denotes left-shifting and $\sqcup$ denotes concatenation. In other words, the endpoint component $E_0$ is formed from the concatenation of $C_0$ with itself, and the endpoint component $E_1$ is formed from the concatenation of $C_1$ with itself.

In contrast, when conversion of a decoded colour value to the sRGB colour space is enabled, the colour endpoint components $C_0$ and $C_1$ are expanded to $E_0$ and $E_1$ respectively by concatenation with the 8-bit binary string representing the value 128, i.e.

$$E_0 = (C_0 << 8) | 128 = C_0 \sqcup 0b10000000 \qquad (4)$$

$$E_1 = (C_1 << 8) | 128 = C_1 \sqcup 0b10000000 \qquad (5)$$

By substituting equations (2) and (3) into equation (1), it can be seen that an alternative expression for calculating the interpolated result P (for the case that conversion to the sRGB colour space is disabled) is given by:

$$P = \lfloor (E_0 \cdot (64-i) + E_1 \cdot i + 32)/65 \rfloor = \lfloor ((C_0 \sqcup C_0) \cdot (64-i) + (C_1 \sqcup C_1) \cdot i +=)/64 \rfloor = \lfloor ((C_0 \cdot (64-i) + C_1 \cdot i) << 8 + (C_0 \cdot (64-i) + C_1 \cdot i + 32))/64 \rfloor = \lfloor ((C_2 << 8) + C_2 + 32)/64 \rfloor \qquad (6)$$

where $$C_2 = C_0 \cdot (64-i) + C_1 \cdot i \qquad (7)$$

Similarly, by substituting equations (3) and (4) into equation (1), it can be seen that an alternative expression for calculating the interpolated result P (for the case that conversion to the sRGB colour space is enabled) is given by:

$$P = \lfloor (E_0 \cdot (64-i) + E_1 \cdot i + 32)/64 \rfloor = \lfloor ((C_0 \sqcup 128) \cdot (64-i) + (C_1 \sqcup 128) \cdot i + 32)/64 \rfloor = \lfloor ((C_0 \cdot (64-i) + C_1 \cdot i) << 8 + (128 \cdot (64-i) + 128 \cdot i) + 32)/64 \rfloor = \lfloor ((C_2 << 8) + 128.64 +=)/64 \rfloor \qquad (8)$$

where again $C_2 = C_0 \cdot (64-i) + C_i \cdot i$.

The range of values for the weight index i is limited to 0-64, which enables the case where i=64 to be treated as an exception case.

It can be seen from equation (7) that when i<64 (a non-exception case):

$$C_2 = C_2^{\overline{exc}} = C_0 \cdot (64-i) + C_1 \cdot i \qquad (9)$$

And when i=64 (the exception case):

$$C_2 = C_2^{exc} = C_i \cdot i \qquad (10)$$

Interpolator 902 operates to interpolate between inputs $C_0$ and $C_1$ using weight index i to calculate the intermediate interpolation result $C_2^{\overline{exc}}$ by implementing equation (9). Thus, conveniently, the interpolator 902 operates on 8-bit components $C_0$ and $C_1$ rather than 16-bit endpoint components $E_0$ and $E_1$ as in conventional interpolators, meaning the size of the interpolator 902 can be reduced compared to conventional interpolators.

The binary logic circuit can be configured so that the interpolator 902 receives only the six least significant bits of the weight index i (which enables the interpolator to perform an interpolation for the non-exception values of the weight index i in the range 0-63). In other words, the interpolator 902 can perform the interpolation to generate the intermediate result $C_2^{\overline{exc}}$ using the six least significant bits of the weight index i in accordance with equation (9) if i<64. The result of the interpolator 902 will be arbitrary when i=64.

Exception cases (i=64) are handled by exception-handling circuitry 918. The exception handling circuitry 918 is configured to generate the intermediate result $C_2^{exc}$ in accordance with equation (10) when i=64. The exception handling circuitry 918 receives as an input the value $C_1$ and generates from this input the intermediate result $C_2^{exc}$. The circuitry 918 takes the form of a shifter that is configured to left-shift the input $C_1$ by six bits (equivalent to multiplying the input $C_1$ by 64) to generate the intermediate result $C_2^{exc}$ when i=64.

The intermediate interpolation results $C_2^{\overline{exc}}$ and $C_2^{exc}$ are input into the combinational logic circuitry 904 which operates to generate the final interpolation result P in accordance with either equation (6) or (8) depending on whether conversion to the sRGB colour space is enabled or disabled. In other words, the combinational logic circuitry 904 generates the final interpolation result P by implementing either equations (6) or (8). In more detail, the intermediate interpolation results $C_2^{\overline{exc}}$ and $C_2^{exc}$ are received by the formatting circuitry 906. The formatting circuitry 906 operates to generate further intermediate results $\overline{C_2'}$ and $C_2'$ in dependence on whether conversion of colour data to sRGB is enabled. It obtains result $C_2''$ in a way that depends on whether the weighting index i has the exception value 64.

The formatting circuitry 906 comprises a logic unit 914 and a selection unit 916. Logic unit 914 is configured to receive as an input the intermediate results $C_2^{\overline{exc}}$ and $C_2^{exc}$ and a signal indicating whether conversion to the sRGB colour space is enabled or disabled (which may be referred to as an sRGB signal). The signal may for example be a binary flag, where a first value of the flag indicates that conversion to sRGB is enabled and a second value of the flag indicates that conversion to sRGB is not enabled. The logic unit 914 is configured to generate output result $\overline{C_2'}$ equal to the intermediate interpolated result $C_2^{\overline{exc}}$ if the sRGB signal indicates that conversion to sRGB is not enabled, and equal to $C_2^{\overline{exc}}+32$ if the sRGB signal indicates that conversion to sRGB is enabled. The logic unit 914 further generates the output result $C_2'$ equal to the intermediate interpolated result $C_2^{exc}$ if the sRGB signal indicates that conversion to sRGB is not enabled, and equal to $C_2^{exc}+32$ if the sRGB signal indicates that conversion to sRGB is enabled.

In other words, the logic unit 914 is configured to generate output intermediate results:

$$C_2' = \begin{cases} C_2^{exc} & \text{if } \overline{sRGB} \text{ and } i = 64 \\ C_2^{exc} + 32 & \text{if } sRGB \text{ and } i = 64 \end{cases} \quad (11)$$

$$\overline{C_2'} = \begin{cases} C_2^{\overline{exc}} & \text{if } \overline{sRGB} \text{ and } i < 64 \\ C_2^{\overline{exc}} + 32 & \text{if } sRGB \text{ and } i < 64 \end{cases}$$

In equation (11), the notation 'sRGB' means that conversion to sRGB is enabled, and '$\overline{sRGB}$' means that conversion to sRGB is not enabled.

The generated intermediate results are input into selection unit 916. The selection unit 916 operates to generate a further intermediate result (denoted $C_2''$), where the intermediate result $C_2''$ depends on whether the index i is equal to the exception value 64 or is less than 64. The selection unit 916 receives as inputs: (i) the intermediate results $C_2'$ and $\overline{C_2'}$ generated by the logic unit 914; and (ii) the weighting index i. The selection unit 916 is configured to generate the output $C_2''$ to be equal to one of the intermediate results $C_2'$ and $\overline{C_2'}$ in dependence on the weighting index i. In other words, the selection unit 916 handles the exception case by outputting $\overline{C_2'}$ if i<64 and the exception result $C_2'$ when i=64, which are as follows:

$$C_2'' = \begin{cases} C_2 = C_1 \ll 6 & \text{if } \overline{sRGB} \text{ and } i = 64 \\ C_2 + 32 = (C_1 \ll 6) + 32 & \text{if } sRGB \text{ and } i = 64 \end{cases} \quad (12)$$

-continued
$$C_2'' = \begin{cases} C_2 = C_0.(64-i) + C_1.i & \text{if } \overline{sRGB} \text{ and } i < 64 \\ C_2 + 32 = C_0.(64-i) + C_1.i + 32 & \text{if } sRGB \text{ and } i < 64 \end{cases} \quad (13)$$

Selection unit 916 may therefore be a MUX.

Both exception values in equation (12) are obtained from input $C_1$ only, using the constant left-shifter 918 and logic unit 914. The selection unit 916 will select appropriately between non-exception values $\overline{C_2'}$ and the exception values $C_2'$ based on the input i.

Thus, the combination of the logic unit 914, shifter unit 918, and selection unit 916 of the formatting circuitry 906 operate to generate the intermediate interpolated result $C_2''$ as: (i) the $C_2$ when conversion of colour data to sRGB colour space is not enabled; (ii) the summation of the result $C_2$ and a numerical constant (32 in this implementation) when conversion of colour data to sRGB colour space is enabled. Mathematically:

$$C_2'' = \begin{cases} C_2 & \text{if } \overline{sRGB} \\ C_2 + 32 & \text{if } sRGB \end{cases} \quad (14)$$

The intermediate interpolated result $C_2''$ output from formatting circuitry 906 is input into shifter and adder logic unit 908.

Unit 908 is configured to left-shift the intermediate result $C_2''$ by a number of bits equal to the number of bits of each colour endpoint component $C_0, C_1$ (i.e., 8 bits in this example) to generate a shifted result, and to add to the shifted result a numerical constant (in this example 32) to generate a further intermediate interpolated result $C_2'''$.

Mathematically, the unit 908 generates the intermediate result $C_2'''$ by performing the following operation:

$$C_2''' = (C_2'' \ll 8) + 32 \quad (15)$$

Substituting in the values of $C_2''$ given by equation (14), it can be seen the value of $C_2'''$ calculated by unit 908 is equal to one of two values in dependence on whether the conversion to sRGB is enabled:

$$C_2''' = (C_2'' \ll 8) + 32 = \begin{cases} (C_2 \ll 8) + 32 & \text{if } \overline{sRGB} \\ ((C_2 + 32) \ll 8) + 32 & \text{if } sRGB \end{cases} \quad (16)$$

It is noted that $2^{13} = 128.64$, and thus:

$$C_2''' = \begin{cases} (C_2 \ll 8) + 32 & \text{if } \overline{sRGB} \\ (C_2 \ll 8) + 128.64 + 32 & \text{if } sRGB \end{cases} \quad (17)$$

The intermediate result $C_2'''$ is output to logic unit 910. The logic unit 910 is configured to output a further intermediate result $C_2^{iv}$. The logic unit 910 receives as an input the intermediate signal $C_2''$ output by the formatting circuitry 906. The unit 910 also receives as an input the sRGB signal. The logic unit 910 is configured to conditionally add the intermediate result $C_2''$ to the intermediate result $C_2'''$ in dependence on whether conversion to sRGB is enabled. Specifically, logic unit 910 is configured to add the intermediate result $C_2''$ to the received intermediate result $C_2'''$ if sRGB conversion is not enabled to form intermediate result $C_2^{iv}$, and to output intermediate result $C_2^{iv}$ equal to $C_2'''$ if sRGB conversion is enabled.

Expressed mathematically, the logic unit 910 is configured to output the intermediate result $C_2^{iv}$ calculated as:

$$C_2^{iv} = \begin{cases} C_2''' = (C_2 \ll 8) + 128.64 + 32 \text{ if } sRGB \\ C_2''' + C_2'' = (C_2 \ll 8) + 32 + C_2 \text{ if } \overline{sRGB} \end{cases} \quad (18)$$

The intermediate result $C_2^{iv}$ is input into shifter 912. Shifter 912 is configured to right-shift the input $C_2^{iv}$ to generate the final interpolated result P. In this example, shifter 912 is configured to right-shift the input $C_2^{iv}$ by 6 bits, which is equivalent to dividing the input by the numerical value of 64 and rounding the quotient to the greatest integer less than or equal to it. Thus, the value of P output by the combinational logic circuitry is equal to:

$$P = C_2^{iv} \gg 6 = \lfloor C_2^{iv}/64 \rfloor = \begin{cases} \lfloor((C_2 \ll 8) + 128.64 + 32)/64\rfloor \text{ if } sRGB \\ \lfloor((C_2 \ll 8) + 32 + C_2)/64\rfloor \text{ if } \overline{sRGB} \end{cases} \quad (19)$$

A comparison of equation (19) with equations (6) and (8) demonstrates that the binary logic circuit 900 has correctly calculated the final interpolation result P for both cases where conversion to sRGB is enabled and cases where conversion to sRGB is not enabled, for all non-negative integer weighting indices i≤64.

Figure 10:
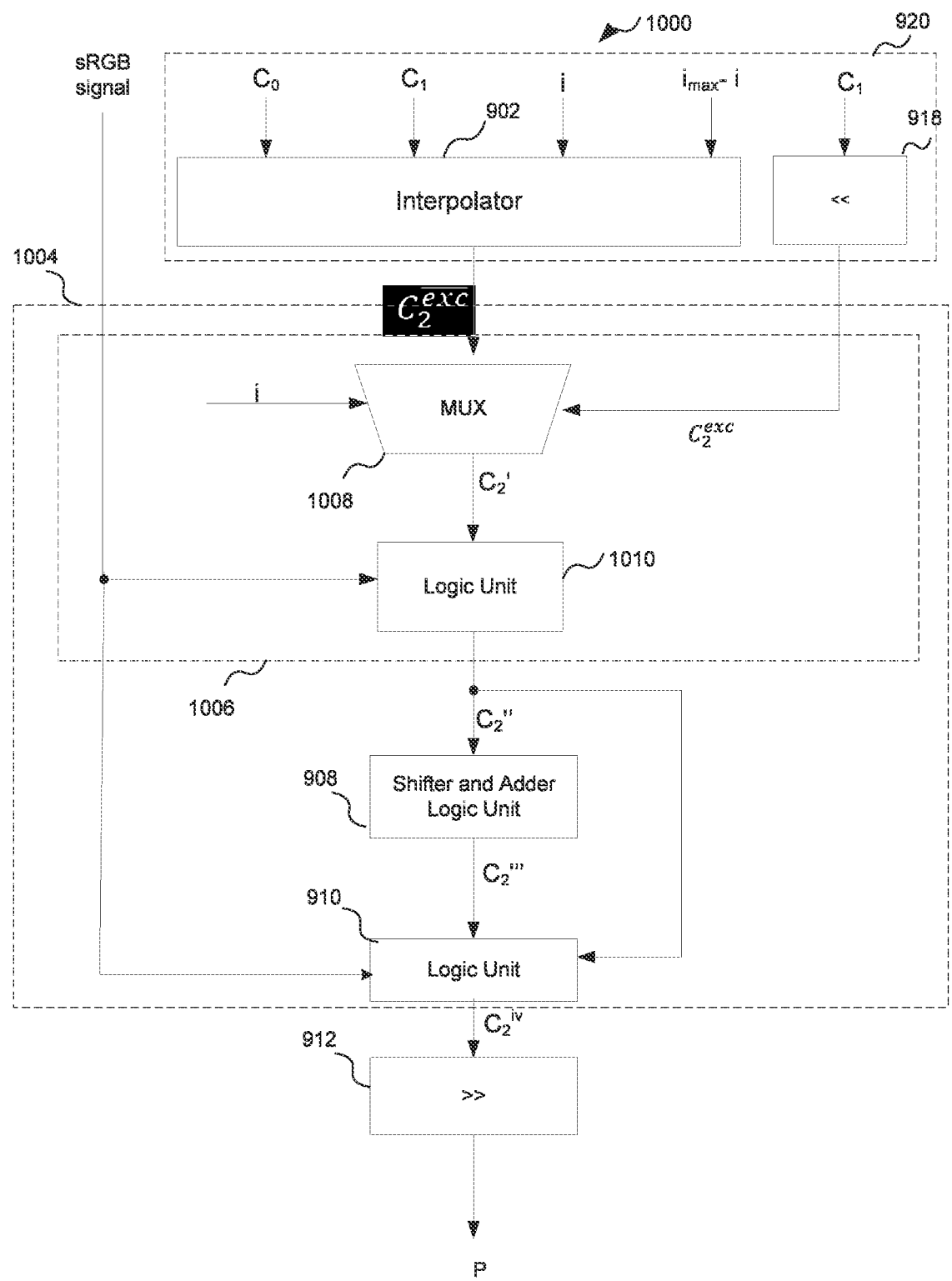
FIG. 10 shows an alternative example of an interpolation unit supporting LDR inputs forming part of the decoder shown in FIG. 3.

FIG. 10 shows an alternative structure of an interpolation unit 1000 that supports only an LDR mode of operation. The interpolation unit 1000 is again in the form of a binary logic circuit.

The binary logic circuit comprises interpolation unit 920 and combinational logic circuitry 1004. The combinational logic circuitry 1004 comprises formatting circuitry 1006; a shifter and adder logic unit 908; an additional logic unit 910 and a shifter 912. The differences between binary logic circuit 900 and 1000 reside in the formatting circuitry, which will now be explained in more detail.

The interpolation unit 920 outputs the intermediate interpolation result $C_2$. In particular, interpolator 902 outputs intermediate interpolation result $C_2^{\overline{exc}}$ in accordance with equation (9) if i<64 as described above and exception handling circuitry 918 generates the intermediate result $C_2^{exc}$ in accordance with equation (10) when i=64 as described above.

The combinational logic circuitry 1004 receives the intermediate results $C_2^{\overline{exc}}$ and $C_2^{exc}$ and performs a set of logical processing operations to generate the final interpolation result P in accordance with, e.g. by implementing, equations (6) and (8).

Formatting circuitry 1004 receives the intermediate results $C_2^{\overline{exc}}$ and $C_2^{exc}$ and operates to generate the further intermediate result $C_2''$ from these inputs dependent on whether conversion of colour data to sRGB is enabled. It obtains the result $C_2''$ in a way that depends on whether the weighting index i has a value equal to the exception value.

The formatting circuitry 1006 comprises selection unit 1008 and logic unit 1010. Selection unit 1008 operates to generate a further intermediate result $C_2'$, where the intermediate result $C_2'$ is selected from the output of either the interpolator 902 or the exception case shifter 918 depending on whether the index i is equal to the exception value (i=64) or is not equal to an exception value (i.e. i<64). In other words, the selection unit 1008 handles exception cases by outputting an intermediate result $C_2'$ as calculated by different hardware branches depending if the weighting index is equal to an exception value or if the weighting index is not equal to an exception value. Specifically, the selecting unit receives as inputs: (i) the intermediate results $C_2^{\overline{exc}}$ and $C_2^{exc}$ generated by the interpolator 902 and circuitry 918 respectively; and (ii) the weighting index i. The selection unit 916 is configured to generate the output $C_2''$ to be equal to one of the intermediate results $C_2'$ and $\overline{C_2'}$ in dependence on the weighting index i. In other words, the selection unit 916 handles the exception case by outputting the non-exception values $\overline{C_2'}$ if i<64 and the exception result $C_2'$ when i=64, which are as follows:

$$C_2' = \begin{cases} C_2 = C_1 \ll 6 \text{ if } i = 64 \\ C_2 = C_0 \cdot (64-i) + C_1 \cdot i \text{ if } i < 64 \end{cases} \quad (20)$$

Selection unit 916 may therefore be a MUX.

The further intermediate result $C_2'$ is input into logic unit 1010. Logic unit 1010 further receives as an input the sRGB signal. The logic unit 1010 is configured to generate a further intermediate result $C_2''$ equal to the received intermediate result $C_2'$ if the sRGB signal indicates that conversion to sRGB is not enabled, and to generate an output result $C_2''=C_2'+32$ if the sRGB signal indicates that conversion to sRGB is enabled. In other words, the logic unit 1010 is configured to generate an output result $C_2''$, where:

$$C_2'' = \begin{cases} C_2' = C_2 \text{ if } \overline{sRGB} \\ C_2' + 32 = C_2 + 32 \text{ if } sRGB = \end{cases} \quad (21)$$

The logic unit 1010 operates to generate the intermediate interpolated result $C_2''$ as: (i) the $C_2$ when conversion of colour data to sRGB colour space is not enabled; (ii) the summation of the result $C_2$ and a numerical constant (32 in this implementation) when conversion of colour data to sRGB colour space is enabled.

Formatting circuitry 1006 differs from formatting circuitry 906 in that the order of the selection unit and logic unit in circuitry 1006 is reversed compared to circuitry 906. However, a comparison of equations (21) and (14) demonstrates that both types of circuitry receive the same intermediate results $C_2^{\overline{exc}}$ and $C_2^{exc}$ and output the same further intermediate result $C_2''$.

The remaining components 908 to 912 of circuit 1000 are equivalent to those in circuit 900, and so a description of these components will not be repeated here.

Example interpolation units will now be described that support both LDR and HDR modes of operation.

LDR and HDR Mode

Figure 11:
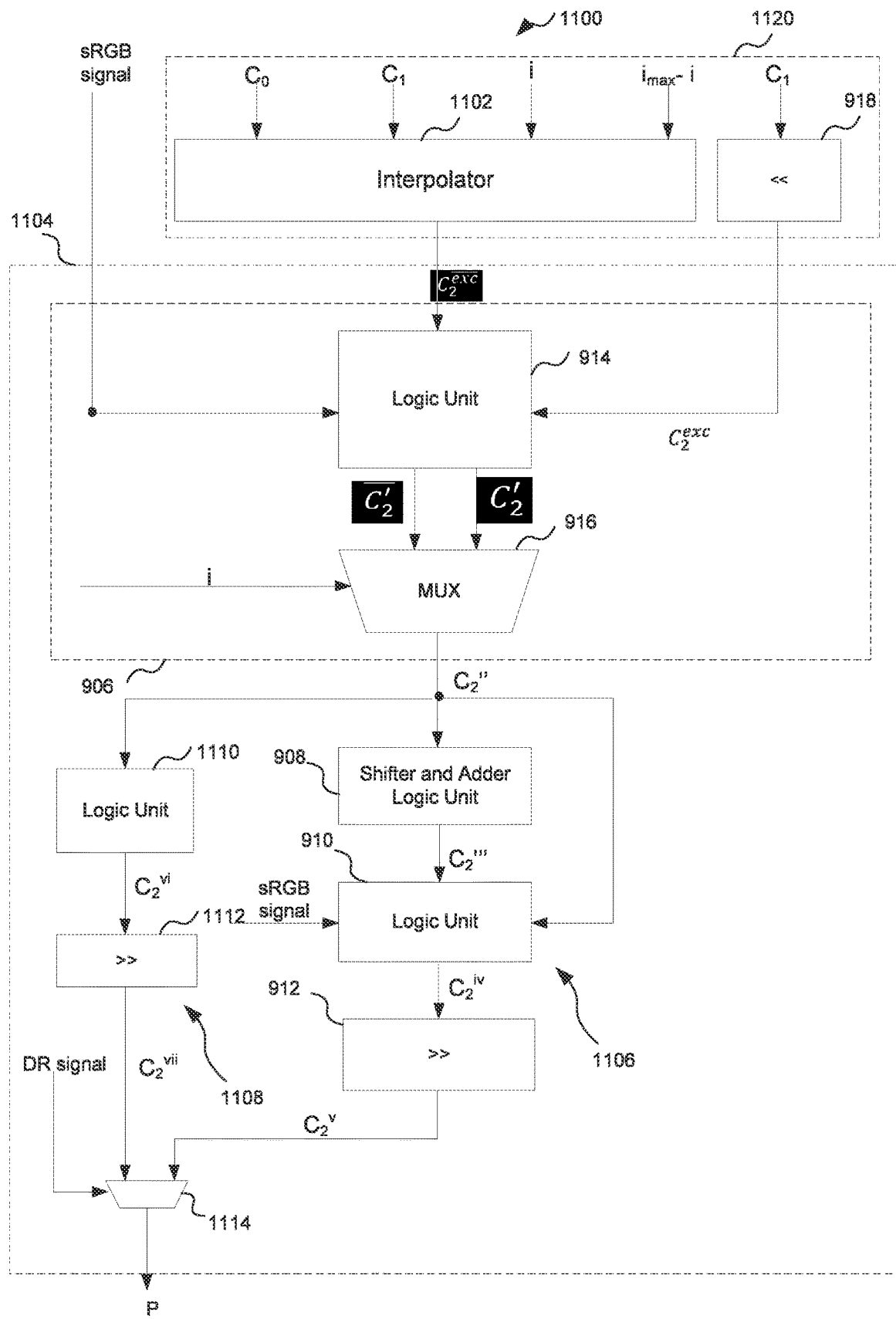
FIG. 11 shows an example of an interpolation unit supporting LDR and HDR inputs forming part of the decoder shown in FIG. 3.

FIG. 11 shows an example structure of an interpolation unit 1100. The interpolation unit 1100 supports both an LDR mode of operation and an HDR mode of operation; i.e. it is configured to operate on both LDR and HDR inputs.

The interpolation unit 1100 is in the form of a binary logic circuit that operates on binary inputs. The binary logic circuit comprises an interpolation unit 1120 and combinational logic circuitry 1104. The interpolation unit 1120 comprises interpolator 1102 and exception-handling circuitry 918. The combinational logic circuitry 1104 comprises formatting circuitry 906; a first circuit branch 1106 and a second circuit branch 1108. The first circuit branch 1106 comprises shifter and adder logic unit 908; additional logic unit 910 and shifter 912. The binary logic circuit 900 is configured to perform an interpolation calculation between endpoint components $E_0$ and $E_1$ using weighting index i output from the weight decode unit 306 to form an interpolated result, P. Endpoints $E_0$ and $E_1$ may be either LDR inputs or HDR inputs. The value of P is as specified above by equation (1), repeated again here for reference:

$$P=\lfloor(E_0\cdot(64-i)+E_1\cdot i+32)/64\rfloor \quad (1)$$

Endpoints $E_0$ and $E_1$ are again UNORM 16 bit values. $E_0$ is formed from an expansion of colour endpoint component $C_0$ and $E_1$ is formed from an expansion of colour endpoint component $C_1$.

When the colour endpoint components $C_0$ and $C_1$ are 8-bit LDR inputs, the expansion to $E_0$ and $E_1$ respectively is given by equations (2) and (3) above.

When the colour endpoint components $C_0$, $C_1$ are instead HDR inputs, they are UNORM 12-bit values. The ASTC standard specifies that when $C_0$ and $C_1$ are HDR inputs, the expansion to the 16-bit values $E_0$ and $E_1$ respectively is performed by zero-padding, i.e.

$$E_0=C_0<<4=C_0\sqcup 0b0000 \quad (22)$$

$$E_1=C_1<<4=C_1\sqcup 0b0000 \quad (23)$$

In other words, endpoint component $E_0$ is formed by left-shifting colour endpoint component $C_0$ by four bits, and $E_1$ is formed by left-shifting colour endpoint component $C_1$ by four bits. It is noted that conversion to sRGB is not enabled for the HDR mode of operation, and equations (18) and (19) represent the single way of expanding 12-bit HDR inputs to 16-bit values as mandated by the ASTC specification.

By substituting equations (22) and (23) into equation (1), it can be seen that an alternative expression for calculating the interpolated result P for HDR inputs is given by:

$$p=\lfloor(E_0\cdot(64-i)+E_1\cdot i+32)/64\rfloor=\lfloor((C_0<<4)\cdot(64-i)+(C_1<<4)\cdot i+32)/64\rfloor=\lfloor((C_0\cdot(64-i)+C_1\cdot i)<<4+=)/64\rfloor=\lfloor((C_2<<4)+32)/64\rfloor=\lfloor((C_2+(32\times\times4))<<4)/64\rfloor=((C_2+2)>>2) \quad (24)$$

where again $C_2=C_0\cdot(64-i)+C_1\cdot i$.

The interpolator 1102 of the interpolation unit 1120 operates to interpolate between inputs $C_0$ and $C_1$ using weight index i to calculate the intermediate interpolation result $C_2^{\overline{exc}}$ in accordance with, e.g. by implementing, equation (9) when i<64.

Exception cases (i=64) are handled by exception-handling circuitry 918 of the interpolation unit 1120. The exception handling circuitry 918 is configured to generate the intermediate result $C_2^{exc}$ in accordance with equation (10) when i=64. The exception handling circuitry 918 receives as an input the value $C_1$ and generates from this input the intermediate result $C_2^{exc}$. The circuitry 918 takes the form of a shifter that is configured to left-shift the input $C_1$ by six bits (equivalent to multiplying the input $C_1$ by 64) to generate the intermediate result $C_2^{exc}$ when i=64.

The intermediate results $C_2^{\overline{exc}}$ and $C_2^{exc}$ are received by the combinational logic circuitry 1104 which performs one or more logical processing operations to calculate the interpolation result P. For LDR inputs, the combination logic circuitry 1104 calculates the interpolation result P in accordance with, e.g. by implementing, either equations (6) or (8) above depending on whether conversion to sRGB is enabled or disabled.

For HDR inputs, the combination logic circuitry 1104 calculates the interpolation result P in accordance with equation (24).

It is noted that for both LDR and HDR inputs, an equivalent mathematical interpolation is performed between endpoint components $C_0$ and $C_1$ to calculate the intermediate interpolation result $C_2^{\overline{exc}}$, where the endpoint components are 8-bit values when LDR and 12-bit values when HDR. Thus, interpolator 1102 can be configured to interpolate between inputs $C_0$ and $C_1$ using weight index i to calculate the intermediate interpolation result $C_2^{\overline{exc}}$ for both LDR and HDR inputs when i<64. To enable the interpolator 1102 to operate on both LDR and HDR inputs, the interpolator 1102 is configured to operate on the larger-size 12-bit HDR inputs. It is noted that 8-bit LDR colour endpoint components $C_0$ and $C_1$ may therefore be formatted prior to being input to the interpolator 1102 to prepend four zero bits to the most significant bit. That is, the 8-bit LDR endpoints $C_0$ and $C_1$ may be padded with four zeros to generate a 12-bit value for input to the interpolator 1102. This generates a 12-bit input for the interpolator 1102 without changing the numerical value of 8-bit endpoint components. This formatting may be performed by a formatting circuitry (e.g. circuitry that performs concatenation with a constant signal) not shown in FIG. 11.

By optimising the interpolator 1102 to perform the interpolation using the six least significant bits of the weight index i and treat the case of i=64 as an exception result (as described above with reference to FIG. 9), interpolator 1102 can be implemented as a 12×6-bit interpolator. Thus, interpolator 1102 can support both LDR and HDR inputs and still present reductions in hardware size and processing time compared to conventional ASTC interpolators, which may be 16×6 bits in size.

The intermediate interpolated results $C_2^{\overline{exc}}$ and $C_2^{exc}$ calculated by interpolator 1102 and circuitry 918 respectively are input into the formatting circuitry 906. The formatting circuitry 906 generates a further intermediate interpolation result $C_2''$ in same way as that described above with reference to FIG. 9. The value of $C_2''$ is given by equation (14).

The intermediate result $C_2''$ is then input into the first circuit branch 1106. The first circuit branch comprises shifter 908, logic unit 910 and right-shifter 912 which operate in the same way as described above with reference to FIG. 9. The first circuit branch 1106 outputs an interpolation result $C_2^v$ which, for LDR colour endpoint components $C_0$ and $C_1$, is equal to the value of P specified by equation (19). That is, for LDR range inputs, the first circuit branch 1106 generates interpolation result $C_2^v$ given by:

$$C_2^v = \begin{cases} \lfloor((C_2\ll 8)+128.64+32)/64\rfloor & \text{if } sRGB \\ \lfloor((C_2\ll 8)+32+C_2)/64\rfloor & \text{if } \overline{sRGB} \end{cases} \quad (25)$$

In this example, intermediate result $C_2''$ is also input into the second circuit branch 1108. The second circuit branch comprises a logic unit 1110 and a right shifter 1112. As this branch concerns the formatting for HDR inputs only, which only works correctly when sRGB conversion is disabled, no connection to or provision for sRGB logic is made. In other words, the second circuit branch 1108 does not receive as an input the sRGB signal. Logic unit 1110 operates to add a fixed numerical constant to the received input $C_2''$ to generate a further intermediate result $C_2^{vi}$. In this example, that numerical constant is '2'. Logic unit 1110 may therefore be an adder unit.

Thus, logic unit 1110 generates an output intermediate result $C_2^{vi}$ from the intermediate result $C_2''$ given by:

$$C_2^{vi}=C_2''+2 \quad (26)$$

The intermediate result $C_2^{vi}$ is then input into shifter 1112, which operates to right-shift the input by two bits to generate the interpolation result $C_2^{vii}$, given by:

$$C_2^{vii}=(C_2''+2)>>2 \qquad (27)$$

Thus, for HDR inputs, it can be seen from (21) that the second circuit branch outputs the interpolation result $C_2^{vii}$, given by:

$$C_2^{vii}=(C_2+2)>>2 \text{ if } \overline{sRGB} \qquad (28)$$

A comparison of equation (28) with equation (24) and equation (25) with (19) verifies that the first circuit branch 1106 outputs the correct LDR interpolation result when colour endpoint components $C_0$ and $C_1$ are LDR, and the second circuit branch 1108 outputs the correct HDR interpolation result when colour endpoint components $C_0$ and $C_1$ are HDR and sRGB conversion is disabled. Since sRGB conversion may not be performed in HDR mode, the output from branch 1108 when sRGB conversion is enabled is irrelevant in the context of the ASTC specification.

The LDR interpolation result $C_2^v$ output from first circuit branch 1106 and the HDR interpolation result $C_2^{vii}$ output from the second circuit branch 1108 are input into selection unit 1114. Selection unit 1114 also receives as an input a signal indicating whether the colour endpoint components $C_0$ and $C_1$ input to the binary logic circuit 1100 are LDR or HDR inputs. This signal may be referred to as a dynamic range (DR) indication signal. The signal may be a binary flag, where one value of the flag indicates the colour endpoint components are LDR inputs and another value of the flag indicates the colour endpoint components are HDR inputs. The selection unit 1114 is configured to output one of the received LDR interpolation result $C_2^v$ 1106 the HDR interpolation result $C_2^{vii}$ as the final interpolation result P in dependence on the received DR indication signal. Specifically, the selection unit 1114 is configured to output the HDR interpolation result $C_2^{vii}$ as the interpolation result P if the DR signal indicates the colour endpoint components are HDR, and to output the LDR interpolation result $C_2^v$ as the interpolation result P if the DR signal indicates the endpoint components are LDR.

Figure 12:
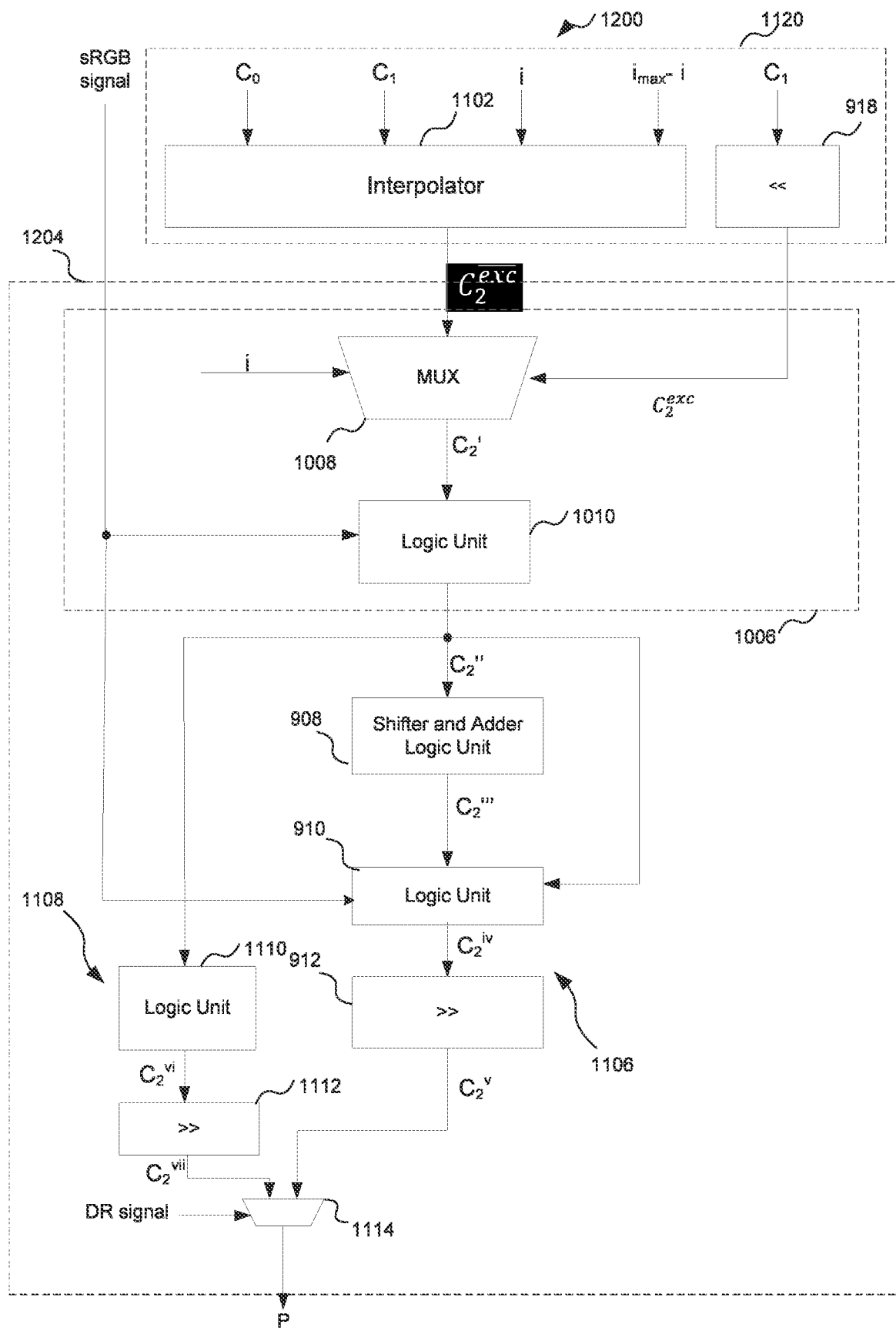
FIG. 12 shows an alternative example of an interpolation unit supporting LDR and HDR inputs forming part of the decoder shown in FIG. 3.

FIG. 12 shows an alternative binary logic circuit 1200 that supports both LDR and HDR modes of operation. Circuit 1200 is a modified version of circuit 1000 shown in FIG. 10 that includes first and second circuit branches 1106 and 1108 for calculating an LDR interpolation result $C_2^V$ and HDR interpolation result $C_2^{vii}$ respectively.

Circuit 1200 includes interpolation unit 1120 that generates intermediate result $C_2$. In particular, interpolator 1102 generates the result $C_2^{exc}$ in accordance with equation (9) if i<64 as described above, and exception handling circuitry 918 generates the intermediate result $C_2^{exc}$ in accordance with equation (10) when i=64 as described above.

Combinational logic circuitry 1204 generates a final interpolation result P by performing one or more logical processing operations. The combinational logic circuitry 1204 comprises formatting circuitry 1006; a first circuit branch 1106 and a second circuit branch 1108. The formatting circuitry 1006 generates further intermediate result $C_2''$ in the same way described above with reference to FIG. 10. The intermediate result $C_2''$ is input into the circuit branches 1106 and 1108. The circuit branches 1106 and 1108 operate to generate LDR interpolation result $C_2^v$ and HDR interpolation result $C_2^{vii}$ respectively in the same way described above with reference to FIG. 11. Selection unit 1114 then outputs one of the interpolation results in dependence on the dynamic range (DR) signal as described above with reference to FIG. 11. Thus, a description of these components will not be described again here.

In the example shown in FIG. 12, the second circuit branch 1108 receives as its input the intermediate result $C_2''$. In an alternative example, the second circuit branch may receive as its input the intermediate result $C_2'$ output from the selection unit 1008. This would still enable the circuit branch 1108 to calculate the correct interpolation result for HDR inputs because, in that case, conversion to sRGB is disabled and so $C_2'=C_2''$. In general, the second branch unit can receive as its input any intermediate interpolation result that, for HDR inputs, has a value equal to $C_2$.

The interpolation units described above with reference to FIGS. 9 to 12 operate to calculate an interpolation result between 16-bit endpoint components $E_0$ and $E_1$ by performing an interpolation using 8 or 12-bit colour endpoint components $C_0$ and $C_1$. This enables the size of the interpolator and the processing time required to perform the interpolation to be reduced compared to conventional interpolation units that perform an interpolation using the 16-bit endpoint components. Synthesis results obtained by the inventor have found that an interpolation unit incorporating a 16×7-bit interpolator supporting the LDR mode only can be provided with a circuit area of 460 μm² and a processing time of 0.44 ns, and an interpolation unit incorporating a 16×7-bit interpolator supporting LDR and HDR modes can be provided with a circuit area of 503 μm² and a processing time of 0.44 ns. However, it has been found that a binary logic circuit that supports the LDR mode only in accordance with the examples described herein can be provided with a circuit area of 288 μm² and a processing time of 0.28 ns, representing a 37% area and 36% timing improvement. A binary logic circuit that supports both LDR and HDR modes in accordance with the examples described herein can be provided with a circuit area of 367 μm² and a processing time of 0.22 ns, representing a 27% area and 49% timing improvement.

It will be appreciated that modifications may be made to the binary logic circuit described herein. For example, various examples of combinational logic circuitry may be provided to generate the interpolation result P from the intermediate result $C_2$ calculated by the interpolator as specified by equations (19) and (24).

Though the above examples describe an optimisation in which the interpolator operates on only the six least significant bits of the weight index, in other examples the interpolator may perform the interpolation using seven bits of the weight index i. In this case, the value i=64 is not treated as an exception result, and the formatting circuitry 906 may be amended to remove the selection unit 916, in which case the output of the logic unit 914 is taken as the intermediate result $C_2''$ that is input into the logic unit 908. In other words, in these examples the formatting circuitry generates the intermediate result $C_2''$ from the received input value $C_2$ in dependence on whether conversion to sRGB is enabled, but not in dependence on the value of the weight index.

The interpolation units of FIGS. 9 to 12 are shown as comprising a number of functional blocks. This is schematic only and is not intended to define a strict division between different logic elements of such entities. Each functional block may be provided in any suitable manner. It is to be understood that intermediate values described herein as being formed by a unit need not be physically generated by the unit at any point and may merely represent logical values which conveniently describe the processing performed by the unit between its input and output.

The interpolation units described herein may be embodied in hardware on an integrated circuit. The interpolation units described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed in an integrated circuit manufacturing system configures the system to manufacture an interpolation unit configured to perform any of the methods described herein, or to manufacture an interpolator comprising any apparatus described herein. An integrated circuit definition dataset may be, for example, an integrated circuit description.

There may be provided a method of manufacturing, at an integrated circuit manufacturing system, an interpolation unit as described herein. There may be provided an integrated circuit definition dataset that, when processed in an integrated circuit manufacturing system, causes the method of manufacturing an interpolation unit to be performed.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS® and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture an interpolation unit will now be described with respect to FIG. 13.

Figure 13:
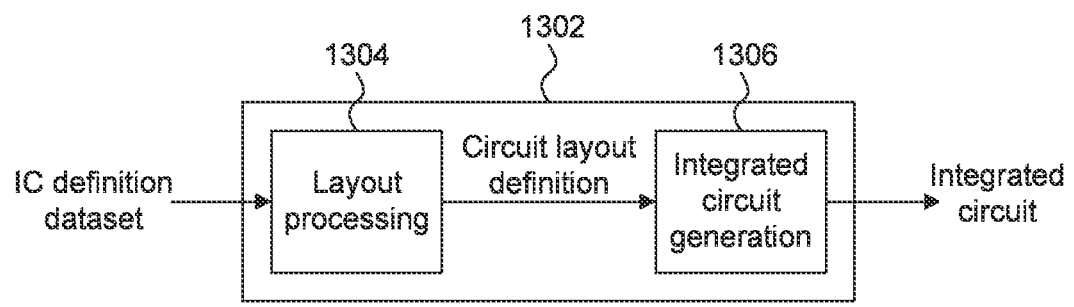
FIG. 13 shows an example integrated circuit manufacturing system.

FIG. 13 shows an example of an integrated circuit (IC) manufacturing system 1302 which is configured to manufacture an interpolation unit as described in any of the examples herein. In particular, the IC manufacturing system 1302 comprises a layout processing system 1304 and an integrated circuit generation system 1306. The IC manufacturing system 1302 is configured to receive an IC definition dataset (e.g. defining an interpolation unit as described in any of the examples herein), process the IC definition dataset, and generate an IC according to the IC definition dataset (e.g. which embodies an interpolation unit as described in any of the examples herein). The processing of the IC definition dataset configures the IC manufacturing system 1302 to manufacture an integrated circuit embodying an interpolation unit as described in any of the examples herein.

The layout processing system 1304 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1304 has determined the circuit layout it may output a circuit layout definition to the IC generation system 1306. A circuit layout definition may be, for example, a circuit layout description.

The IC generation system 1306 generates an IC according to the circuit layout definition, as is known in the art. For example, the IC generation system 1306 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1306 may be in the form of computer-readable code which the IC generation system 1306 can use to form a suitable mask for use in generating an IC.

The different processes performed by the IC manufacturing system 1302 may be implemented all in one location, e.g. by one party. Alternatively, the IC manufacturing system 1302 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture an interpolation unit without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 13 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 13, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The graphics processing systems and/or interpolation units described herein may be embodied in hardware on an integrated circuit. The graphics processing systems described herein may be configured to perform any of the methods described herein.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

What is claimed is:

1. A binary logic circuit for performing an interpolation calculation between two endpoint values $E_0$ and $E_1$ for generating an interpolated result P, the values $E_0$ and $E_1$ being formed from low-dynamic range (LDR) colour endpoint values $C_0$ and $C_1$ respectively, the binary logic circuit being configured to:
perform an interpolation between the colour endpoint values $C_0$ and $C_1$ to generate a first intermediate interpolated result $C_2$; and
perform one or more logical processing operations to calculate the interpolated result P according to the equation $P=\lfloor((C_2<<8)+C_2+32)/64\rfloor$, or according to the equation $P=\lfloor((C_2<<8)+128\cdot 64+32)/64\rfloor$.

2. The binary logic circuit as claimed in claim 1, wherein the interpolation calculation between the two endpoint values $E_0$ and $E_1$ is specified according to the equation $p=\lfloor(E_0\cdot$ $(64-i)+E_1 \cdot i+32)/64]$, where p is equal to the interpolated result P, and i is a weighting index.

3. The binary logic circuit as claimed in claim 1, wherein the binary logic circuit is further configured to perform the interpolation between the colour endpoint values $C_0$ and $C_1$ using a weighting index i to generate the first intermediate interpolated result $C_2$ according to the equation $C_2=C_0 \cdot (64-i)+C_1 \cdot i$ $C_2=$ for non-exception values of i.

4. The binary logic circuit as claimed in claim 3, wherein the binary logic circuit is further configured to generate the first intermediate interpolated result $C_2$ for exception values of i.

5. The binary logic circuit as claimed in claim 4, wherein the binary logic circuit is further configured to generate the first intermediate interpolated result $C_2$ according to the equation $C_2=C_1 \cdot i$ for exception values of i.

6. The binary logic circuit as claimed in claim 4, wherein the binary logic circuit is further configured to:
generate a second intermediate interpolated result from the set of values $C_0$, $C_1$ and $C_2$;
left-shift the second intermediate interpolated result by a number of bits equal to the number of bits of each of the colour endpoint values $C_0$ and $C_1$ and to add to the shifted result a constant to generate a third intermediate interpolated result; and
add the second intermediate interpolated result to the third intermediate interpolated result if the interpolated result P is not to be compatible with the sRGB colour space; and wherein the binary logic circuit is further configured to generate the second intermediate interpolated result as: (i) the first intermediate interpolated result $C_2$, according to the equation $C_2=C_0 \cdot (64-i)+C_1 \cdot i$ for non-exception values of i, when the interpolated result P is not to be compatible with an sRGB colour space and the value of the weighting index is not equal to an exception value; (ii) the summation of the first intermediate interpolated result $C_2$, according to the equation $C_2=C_0 \cdot (64-i)+C_1 \cdot i$ $C_2=$ for non-exception values of i, and a numerical constant when the interpolated result P is to be compatible with an sRGB colour space and the value of the weighting index is not equal to an exception value; (iii) the first intermediate interpolated result $C_2$ generated for exception values of i when the interpolated result P is not to be compatible with an sRGB colour space and the value of the weighting index is equal to an exception value; and iv) the summation of the first intermediate interpolated result $C_2$ generated for exception values of i and a numerical constant when the interpolated result P is to be compatible with an sRGB colour space and the value of the weighting index is equal to an exception value.

7. The binary logic circuit as claimed in claim 4, wherein the binary logic circuit is further configured to:
generate a second intermediate interpolated result from the set of values $C_0$, $C_1$ and $C_2$;
left-shift the second intermediate interpolated result by a number of bits equal to the number of bits of each of the colour endpoint values $C_0$ and $C_1$ and to add to the shifted result a constant to generate a third intermediate interpolated result; and
add the second intermediate interpolated result to the third intermediate interpolated result if the interpolated result P is not to be compatible with the sRGB colour space; and wherein the binary logic circuit is further configured to:
select between (i) a first input dependent on the first intermediate interpolated result $C_2$ generated for exception values of i; and (ii) a second input dependent on the first intermediate interpolated result $C_2$, according to the equation $C_2=C_0 \cdot (64-i)+C_1 \cdot i$ for non-exception values of i, in dependence on whether the value of the weighting index is equal to an exception value.

8. The binary logic circuit as claimed in claim 7, wherein the binary logic circuit is further configured to add a non-zero numerical constant in the generation of the second intermediate interpolated result from the set of values $C_0$, $C_1$ and $C_2$ only if the interpolated result P is to be compatible with an sRBG colour space.

9. The binary logic circuit as claimed in claim 8, wherein the binary logic circuit is configured to add a non-zero numerical constant to the result of the selection between the first input and the second input.

10. The binary logic circuit as claimed in claim 8, wherein the binary logic circuit is configured to generate the second intermediate interpolated result based on the first intermediate interpolated result $C_2$ generated for exception values of i, and the first intermediate interpolated result $C_2$, according to the equation $C_2=C_0 \cdot (64-i)+C_1 \cdot i$ for non-exception values of i.

11. The binary logic circuit as claimed in claim 7, wherein the first input is the first intermediate interpolated result $C_2$ generated for exception values of i and the second input is the first intermediate interpolated result $C_2$, according to the equation $C_2=C_0 \cdot (64-i)+C_1 \cdot i$ for non-exception values of i.

12. The binary logic circuit as claimed in claim 3, wherein the weighting index comprises 7 bits, and the binary logic circuit is configured to perform the interpolation between the colour endpoint values $C_0$ and $C_1$ using the 6 least significant bits of the weighting index.

13. The binary logic circuit as claimed in claim 1, wherein the binary logic circuit is further configured to:
generate a second intermediate interpolated result from the set of values $C_0$, $C_1$ and $C_2$ in dependence on whether the interpolated result P is to be compatible with an sRGB colour space;
left-shift the second intermediate interpolated result by a number of bits equal to the number of bits of each of the colour endpoint values $C_0$ and $C_1$ and to add to the shifted result a constant to generate a third intermediate interpolated result; and
add the second intermediate interpolated result to the third intermediate interpolated result if the interpolated result P is not to be compatible with the sRGB colour space.

14. The binary logic circuit as claimed in claim 13, wherein the binary logic circuit is further configured to right-shift the result of adding the second intermediate interpolated result to the third intermediate interpolated result by a specified number of bits to generate the interpolated result P.

15. The binary logic circuit as claimed in claim 14, wherein the specified number of bits is equal to 6.

16. The binary logic circuit as claimed in claim 13, wherein the binary logic circuit is configured to left-shift the second intermediate interpolated result by 8 bits and to add a numerical constant of 32 to generate the third intermediate interpolated result.

17. The binary logic circuit as claimed in claim 13, wherein the binary logic circuit is configured to generate the second intermediate interpolated result as: (i) the first intermediate interpolated result $C_2$ when the interpolated result P is not to be compatible with an sRGB colour space; (ii) the summation of the first intermediate interpolated result $C_2$ and a numerical constant when the interpolated result P is to be compatible with an sRGB colour space.

18. A method of using a binary logic circuit to interpolate between two endpoint values $E_0$ and $E_1$ for generating an interpolated result P, the values $E_0$ and $E_1$ being formed from low-dynamic range (LDR) colour endpoint values $C_0$ and $C_1$ respectively, the method comprising:

performing an interpolation between the colour endpoint values $C_0$ and $C_1$ to generate a first intermediate interpolated result $C_2$;

performing one or more logical processing operations to calculate the interpolated result P according to the equation $P=\lfloor((C_2<<8)+C_2+32)/64\rfloor$, or according to the equation $P=\lfloor((C_2<<8)+128\cdot64+32)/64\rfloor$.

19. The method as claimed in claim 18, wherein the interpolation calculation between the two endpoint values $E_0$ and $E_1$ is specified according to the equation $p=\lfloor(E_0\cdot(64-i)+E_1\cdot i+32)/64\rfloor$, where p is equal to the interpolated result P, and i is a weighting index.

20. A non-transitory computer readable storage medium having stored thereon a computer readable description of a binary logic circuit for performing an interpolation calculation between two endpoint values $E_0$ and $E_1$ for generating an interpolated result P, the values $E_0$ and $E_1$ being formed from low-dynamic range (LDR) colour endpoint values $C_0$ and $C_1$ respectively, the binary logic circuit being configured to:

perform an interpolation between the colour endpoint values $C_0$ and $C_1$ to generate a first intermediate interpolated result $C_2$; and perform one or more logical processing operations to calculate the interpolated result P according to the equation $P=\lfloor((C_2<<8)+C_2+32)/64\rfloor$, or according to the equation $P=\lfloor((C_2<<8)+128\cdot64+32)/64\rfloor$.

* * * * *

UNITED STATES PATENT AND TRADEMARK OFFICE
CERTIFICATE OF CORRECTION

| | |
|---|---|
| PATENT NO. | : 11,741,641 B2 |
| APPLICATION NO. | : 17/685344 |
| DATED | : August 29, 2023 |
| INVENTOR(S) | : Kenneth Rovers |

Page 1 of 1

It is certified that error appears in the above-identified patent and that said Letters Patent is hereby corrected as shown below:

In the Specification

Column 14, Line 19, please replace:
$$P = \lfloor(E_0.(64-i) + E_1.i + 32)/65$$
With:
$$\underline{\underline{P = \lfloor(E_0.(64-i) + E_1.i + 32)/64}}$$

Signed and Sealed this
Second Day of January, 2024

Katherine Kelly Vidal
*Director of the United States Patent and Trademark Office*